United States Patent
Chand et al.

(10) Patent No.: US 8,260,948 B2
(45) Date of Patent: Sep. 4, 2012

(54) ENHANCED CONTROLLER UTILIZING RFID TECHNOLOGY

(75) Inventors: Sujeet Chand, Brookfield, WI (US); Vivek R. Bapat, Pittsburgh, PA (US); Kenwood H. Hall, Hudson, OH (US); Richard A. Morse, Hudson, OH (US); Joseph P. Owen, Jr., Elm Grove, WI (US); Arthur P. Pietrzyk, Thompson, OH (US); Andreas Somogyi, Sagamore Hills, OH (US); Kenneth A. Tinnell, Loveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1148 days.

(21) Appl. No.: 11/200,915

(22) Filed: Aug. 10, 2005

(65) Prior Publication Data

US 2007/0035396 A1 Feb. 15, 2007

(51) Int. Cl.
*G06F 15/16* (2006.01)
(52) U.S. Cl. ............ 709/231; 455/456.1; 455/41.1; 340/572.1; 340/10.1; 340/10.2; 342/118
(58) Field of Classification Search ............ 709/231
See application file for complete search history.

(56) References Cited

U.S. PATENT DOCUMENTS

| | | | |
|---|---|---|---|
| 2,999,499 A | 9/1961 | Willet | |
| 3,858,212 A | 12/1974 | Tompkins et al. | |
| 4,381,903 A | 5/1983 | Atkins | |
| 4,722,372 A | 2/1988 | Hoffman et al. | |
| 4,949,299 A | 8/1990 | Pickett et al. | |
| 4,967,940 A | 11/1990 | Blette et al. | |
| 5,300,875 A | 4/1994 | Tuttle | |
| 5,461,666 A | 10/1995 | McMahan et al. | |
| 5,494,193 A | 2/1996 | Kirschner et al. | |
| 5,613,228 A | 3/1997 | Tuttle et al. | |
| 5,621,199 A | 4/1997 | Calari et al. | |
| 5,629,981 A | 5/1997 | Nerlikar | |
| 5,689,415 A | 11/1997 | Calotychos et al. | |
| 5,701,127 A | 12/1997 | Sharpe | |
| 5,703,347 A | 12/1997 | Reddersen et al. | |
| 5,785,181 A | 7/1998 | Quartararo, Jr. | |
| 5,798,693 A | 8/1998 | Engellenner | |
| 5,822,714 A | 10/1998 | Cato | |
| 5,874,724 A | 2/1999 | Cato | |

(Continued)

FOREIGN PATENT DOCUMENTS

CN 1426546 A 6/2003

(Continued)

OTHER PUBLICATIONS

OA Dated Aug. 28, 2008 for US Appl. No. 11/129,199, 28 pages.

(Continued)

*Primary Examiner* — Michael Y Won
*Assistant Examiner* — Hua Fan
(74) *Attorney, Agent, or Firm* — Turocy & Watson, LLP; William Walbrun; John Miller

(57) ABSTRACT

A radio frequency identification (RFID) component receives a data stream from at least one RFID tag. A controller can integrate and/or embed at least one of the following, 1) middleware that filters the data stream associated with the RFID component, 2) RFID software that provides RFID component software functionality, and 3) a smart component that connects to the RFID component.

9 Claims, 14 Drawing Sheets

U.S. PATENT DOCUMENTS

| | | | |
|---|---|---|---|
| 5,874,896 A | 2/1999 | Lowe et al. |
| 5,905,249 A | 5/1999 | Reddersen et al. |
| 5,910,776 A | 6/1999 | Black |
| 5,947,167 A | 9/1999 | Bogen et al. |
| 5,949,335 A | 9/1999 | Maynard |
| 5,952,935 A | 9/1999 | Mejia et al. |
| 5,963,134 A | 10/1999 | Bowers et al. |
| 5,964,656 A | 10/1999 | Lawler, Jr. et al. |
| 5,971,587 A | 10/1999 | Kato et al. |
| 5,973,600 A | 10/1999 | Mosher, Jr. |
| 5,983,200 A | 11/1999 | Slotznick |
| 5,992,096 A | 11/1999 | De La Cerda et al. |
| 6,049,745 A | 4/2000 | Douglas et al. |
| 6,091,998 A | 7/2000 | Vasko et al. |
| 6,115,616 A | 9/2000 | Halperin et al. |
| 6,116,505 A | 9/2000 | Withrow |
| 6,121,878 A | 9/2000 | Brady et al. |
| 6,144,301 A | 11/2000 | Frieden |
| 6,150,948 A | 11/2000 | Watkins |
| 6,154,790 A | 11/2000 | Pruett et al. |
| 6,169,483 B1 | 1/2001 | Ghaffari et al. |
| 6,170,059 B1 | 1/2001 | Pruett et al. |
| 6,172,609 B1 | 1/2001 | Lu et al. |
| 6,205,362 B1 | 3/2001 | Eidson |
| 6,211,789 B1 | 4/2001 | Oldham et al. |
| 6,263,440 B1 | 7/2001 | Pruett et al. |
| 6,264,106 B1 | 7/2001 | Bridgelall |
| 6,265,976 B1 | 7/2001 | Roesner et al. |
| 6,272,321 B1 | 8/2001 | Bruhnke et al. |
| 6,275,681 B1 | 8/2001 | Vega et al. |
| 6,282,407 B1 | 8/2001 | Vega et al. |
| 6,282,455 B1 | 8/2001 | Engdahl |
| 6,285,295 B1 | 9/2001 | Casden |
| 6,286,762 B1 | 9/2001 | Reynolds et al. |
| 6,286,763 B1 | 9/2001 | Reynolds et al. |
| 6,293,467 B1 | 9/2001 | Reddersen et al. |
| 6,297,734 B1 | 10/2001 | Richardson et al. |
| 6,305,548 B1 | 10/2001 | Sato et al. |
| 6,307,517 B1 | 10/2001 | Lee |
| 6,317,027 B1 | 11/2001 | Watkins |
| 6,318,636 B1 | 11/2001 | Reynolds et al. |
| 6,330,971 B1 | 12/2001 | Mabry et al. |
| 6,342,839 B1 | 1/2002 | Curkendall et al. |
| 6,353,406 B1 * | 3/2002 | Lanzl et al. .................. 342/118 |
| 6,354,493 B1 | 3/2002 | Mon |
| 6,362,738 B1 | 3/2002 | Vega |
| 6,366,206 B1 | 4/2002 | Ishikawa et al. |
| 6,377,176 B1 | 4/2002 | Lee |
| 6,377,203 B1 | 4/2002 | Doany |
| 6,377,764 B1 | 4/2002 | Morris-jones |
| 6,392,544 B1 | 5/2002 | Collins et al. |
| 6,400,272 B1 | 6/2002 | Holtzman |
| 6,400,372 B1 | 6/2002 | Gossweiler, III et al. |
| 6,401,936 B1 | 6/2002 | Isaacs |
| 6,409,401 B1 | 6/2002 | Petteroti et al. |
| 6,415,978 B1 | 7/2002 | McAllister |
| 6,429,776 B1 | 8/2002 | Alicot et al. |
| 6,445,297 B1 | 9/2002 | Nicholson |
| 6,445,969 B1 | 9/2002 | Kenney |
| 6,448,886 B2 | 9/2002 | Garber et al. |
| 6,451,154 B1 | 9/2002 | Grabau |
| 6,476,708 B1 | 11/2002 | Johnson |
| 6,480,100 B1 | 11/2002 | Frieden et al. |
| 6,484,886 B1 | 11/2002 | Isaacs |
| 6,486,780 B1 | 11/2002 | Garber |
| 6,501,382 B1 | 12/2002 | Rehfus |
| 6,505,780 B1 | 1/2003 | Yassin et al. |
| 6,517,000 B1 | 2/2003 | McAllister et al. |
| 6,523,752 B2 | 2/2003 | Nishitani et al. |
| 6,529,880 B1 | 3/2003 | McKeen et al. |
| 6,547,040 B2 | 4/2003 | Goodwin, III |
| 6,549,064 B2 | 4/2003 | Bandy et al. |
| 6,554,187 B2 | 4/2003 | Otto |
| 6,563,425 B2 | 5/2003 | Nicholson et al. |
| 6,566,997 B1 | 5/2003 | Bradin |
| 6,585,165 B1 | 7/2003 | Kuroda |
| 6,587,856 B1 | 7/2003 | Srinivasan et al. |
| 6,593,853 B1 | 7/2003 | Barrett et al. |
| 6,600,418 B2 | 7/2003 | Francis et al. |
| 6,607,123 B1 | 8/2003 | Jollifee et al. |
| 6,608,551 B1 | 8/2003 | Anderson et al. |
| 6,608,561 B2 | 8/2003 | Lawler, Jr. et al. |
| 6,612,495 B2 | 9/2003 | Reddersen et al. |
| 6,617,962 B1 | 9/2003 | Horwitz et al. |
| 6,621,417 B2 | 9/2003 | Duncan et al. |
| 6,622,567 B1 | 9/2003 | Hamel et al. |
| 6,641,042 B1 | 11/2003 | Pierenkemper et al. |
| 6,650,227 B1 | 11/2003 | Bradin |
| 6,664,897 B2 | 12/2003 | Pape et al. |
| 6,669,089 B2 | 12/2003 | Cybulski et al. |
| 6,672,512 B2 | 1/2004 | Bridgelall |
| 6,677,852 B1 * | 1/2004 | Landt .......................... 340/10.1 |
| 6,685,059 B2 | 2/2004 | Jones et al. |
| 6,687,293 B1 | 2/2004 | Loyer et al. |
| 6,693,539 B2 | 2/2004 | Bowers et al. |
| 6,700,533 B1 | 3/2004 | Werb et al. |
| 6,700,931 B1 | 3/2004 | Lee et al. |
| 6,707,376 B1 | 3/2004 | Patterson et al. |
| 6,712,276 B1 | 3/2004 | Abali et al. |
| 6,714,121 B1 | 3/2004 | Moore |
| 6,724,308 B2 | 4/2004 | Nicholson |
| 6,726,099 B2 | 4/2004 | Becker et al. |
| 6,745,008 B1 | 6/2004 | Carrender et al. |
| 6,747,560 B2 | 6/2004 | Stevens, III |
| 6,750,769 B1 | 6/2004 | Smith |
| 6,752,277 B1 | 6/2004 | Sempliner |
| 6,784,789 B2 | 8/2004 | Eroglu et al. |
| 6,784,813 B2 | 8/2004 | Shanks et al. |
| 6,791,603 B2 | 9/2004 | Lazo et al. |
| 6,793,127 B2 | 9/2004 | Alsafadi et al. |
| 6,802,659 B2 | 10/2004 | Cremon et al. |
| 6,808,116 B1 | 10/2004 | Eslambolchi |
| 6,809,646 B1 | 10/2004 | Lee |
| 6,812,824 B1 | 11/2004 | Goldinger et al. |
| 6,812,838 B1 | 11/2004 | Maloney |
| 6,812,841 B2 | 11/2004 | Heinrich et al. |
| 6,816,817 B1 | 11/2004 | Retlich |
| 6,828,902 B2 | 12/2004 | Casden |
| 6,842,106 B2 | 1/2005 | Hughes et al. |
| 6,847,856 B1 | 1/2005 | Bohannon |
| 6,853,294 B1 | 2/2005 | Ramamurthy et al. |
| 6,853,303 B2 | 2/2005 | Chen et al. |
| 6,859,757 B2 | 2/2005 | Muehl et al. |
| 6,870,797 B2 | 3/2005 | Reasoner et al. |
| 6,873,260 B2 | 3/2005 | Lancos et al. |
| 6,878,896 B2 | 4/2005 | Braginsky et al. |
| 6,879,809 B1 | 4/2005 | Vega et al. |
| 6,888,459 B2 | 5/2005 | Stilp |
| 6,897,763 B2 | 5/2005 | Schulmerich et al. |
| 6,899,476 B1 | 5/2005 | Barrus et al. |
| 6,901,304 B2 | 5/2005 | Swan et al. |
| 6,903,656 B1 | 6/2005 | Lee |
| 6,917,291 B2 | 7/2005 | Allen |
| 6,918,541 B2 | 7/2005 | Knowles et al. |
| 6,929,412 B1 | 8/2005 | Barrus et al. |
| 6,935,560 B2 | 8/2005 | Andreasson et al. |
| 6,940,408 B2 | 9/2005 | Ferguson et al. |
| 6,943,678 B2 | 9/2005 | Muirhead |
| 6,943,688 B2 | 9/2005 | Chung et al. |
| 6,945,721 B2 | 9/2005 | Sato |
| 6,967,579 B1 | 11/2005 | Elizondo |
| 6,975,229 B2 | 12/2005 | Carrender |
| 6,992,574 B2 | 1/2006 | Aupperie |
| 6,999,955 B1 | 2/2006 | Horvitz |
| 7,023,342 B2 | 4/2006 | Corbett et al. |
| 7,036,729 B2 | 5/2006 | Chung |
| 7,057,509 B2 | 6/2006 | Gualdi et al. |
| 7,061,379 B2 | 6/2006 | Chen et al. |
| 7,066,388 B2 | 6/2006 | He |
| 7,066,667 B2 | 6/2006 | Chapman et al. |
| 7,069,100 B2 | 6/2006 | Monette et al. |
| 7,073,712 B2 | 7/2006 | Jusas et al. |
| 7,075,412 B1 | 7/2006 | Reynolds et al. |
| 7,079,023 B2 | 7/2006 | Haller |
| 7,084,769 B2 | 8/2006 | Bauer et al. |
| 7,091,861 B2 | 8/2006 | Schmidtberg et al. |
| 7,114,655 B2 | 10/2006 | Chapman et al. |

| | | | |
|---|---|---|---|
| 7,127,507 B1 | 10/2006 | Clark et al. | |
| 7,135,976 B2 | 11/2006 | Neff et al. | |
| 7,151,456 B2 | 12/2006 | Godfrey | |
| 7,165,722 B2 | 1/2007 | Shafer et al. | |
| 7,183,922 B2 | 2/2007 | Mendolia et al. | |
| 7,187,288 B2 | 3/2007 | Mendolia et al. | |
| 7,194,072 B2 | 3/2007 | Gamble | |
| 7,195,159 B2 | 3/2007 | Sloan et al. | |
| 7,197,279 B2* | 3/2007 | Bellantoni | 455/41.2 |
| 7,212,637 B2 | 5/2007 | Salisbury | |
| 7,221,258 B2 | 5/2007 | Lane et al. | |
| 7,230,730 B2 | 6/2007 | Owen et al. | |
| 7,240,027 B2 | 7/2007 | McConnell et al. | |
| 7,272,502 B2* | 9/2007 | Lee et al. | 701/214 |
| 7,292,963 B2* | 11/2007 | Bornhoevd et al. | 702/188 |
| 7,317,394 B2* | 1/2008 | Koh et al. | 340/572.1 |
| 7,336,153 B2 | 2/2008 | Malone et al. | |
| 7,336,167 B2 | 2/2008 | Olsen, III et al. | |
| 7,336,243 B2 | 2/2008 | Jo et al. | |
| 7,339,476 B2 | 3/2008 | Macurek et al. | |
| 7,345,576 B2* | 3/2008 | Allen et al. | 340/10.2 |
| 7,373,087 B2 | 5/2008 | Shi et al. | |
| 7,388,491 B2 | 6/2008 | Chand et al. | |
| 7,389,921 B2* | 6/2008 | Lin et al. | 235/385 |
| 7,413,123 B2 | 8/2008 | Ortenzi | |
| 7,486,181 B2* | 2/2009 | Olsen et al. | 340/505 |
| 7,494,062 B2 | 2/2009 | Holz et al. | |
| 7,510,110 B2 | 3/2009 | Pietrzyk et al. | |
| 7,520,429 B2 | 4/2009 | Koster | |
| 7,551,081 B2 | 6/2009 | Vrba et al. | |
| 7,588,189 B2 | 9/2009 | Fago et al. | |
| 7,616,117 B2 | 11/2009 | Streeb et al. | |
| 7,720,438 B2* | 5/2010 | Rowse | 455/41.1 |
| 7,764,191 B2 | 7/2010 | Hall et al. | |
| 7,845,553 B2 | 12/2010 | Holz et al. | |
| 2001/0000019 A1 | 3/2001 | Bowers et al. | |
| 2001/0008390 A1 | 7/2001 | Berquist | |
| 2001/0015760 A1 | 8/2001 | Fellegara et al. | |
| 2002/0005774 A1 | 1/2002 | Rudolph | |
| 2002/0030597 A1 | 3/2002 | Muirhead | |
| 2002/0067265 A1 | 6/2002 | Rudolph | |
| 2002/0070862 A1 | 6/2002 | Francis et al. | |
| 2002/0130778 A1 | 9/2002 | Nicholson | |
| 2002/0143320 A1 | 10/2002 | Levin | |
| 2002/0155843 A1 | 10/2002 | Bahl et al. | |
| 2002/0165758 A1 | 11/2002 | Hind et al. | |
| 2002/0167397 A1 | 11/2002 | Eroglu et al. | |
| 2002/0185532 A1 | 12/2002 | Berquist et al. | |
| 2003/0007473 A1 | 1/2003 | Strong et al. | |
| 2003/0023337 A1 | 1/2003 | Godfrey et al. | |
| 2003/0071731 A1 | 4/2003 | Jesme | |
| 2003/0102367 A1 | 6/2003 | Monette et al. | |
| 2003/0109951 A1 | 6/2003 | Hsiung et al. | |
| 2003/0126103 A1 | 7/2003 | Chen et al. | |
| 2003/0150908 A1 | 8/2003 | Pokorny et al. | |
| 2003/0169149 A1 | 9/2003 | Ohki et al. | |
| 2003/0203730 A1* | 10/2003 | Wan et al. | 455/404.2 |
| 2003/0210142 A1 | 11/2003 | Freathy et al. | |
| 2003/0216969 A1 | 11/2003 | Bauer et al. | |
| 2003/0225635 A1 | 12/2003 | Renz et al. | |
| 2004/0008123 A1 | 1/2004 | Carrender et al. | |
| 2004/0024570 A1 | 2/2004 | Muehl et al. | |
| 2004/0024644 A1 | 2/2004 | Gui et al. | |
| 2004/0032443 A1 | 2/2004 | Moylan | |
| 2004/0046642 A1 | 3/2004 | Becker et al. | |
| 2004/0061324 A1 | 4/2004 | Howard | |
| 2004/0062294 A1 | 4/2004 | Clemens et al. | |
| 2004/0066281 A1 | 4/2004 | Hughes et al. | |
| 2004/0069851 A1 | 4/2004 | Grunes | |
| 2004/0084526 A1 | 5/2004 | Knowles et al. | |
| 2004/0095910 A1 | 5/2004 | Metts et al. | |
| 2004/0108378 A1 | 6/2004 | Gatz | |
| 2004/0124988 A1 | 7/2004 | Leonard et al. | |
| 2004/0160324 A1 | 8/2004 | Stilp | |
| 2004/0181467 A1 | 9/2004 | Raiyani et al. | |
| 2004/0189443 A1 | 9/2004 | Eastburn | |
| 2004/0220860 A1 | 11/2004 | Persky et al. | |
| 2004/0252025 A1 | 12/2004 | Silverbrook et al. | |
| 2005/0012613 A1 | 1/2005 | Eckstein et al. | |
| 2005/0021369 A1 | 1/2005 | Cohen et al. | |
| 2005/0028417 A1 | 2/2005 | Kim | |
| 2005/0035849 A1 | 2/2005 | Yizhack | |
| 2005/0040934 A1 | 2/2005 | Shanton | |
| 2005/0052283 A1 | 3/2005 | Collins et al. | |
| 2005/0058483 A1 | 3/2005 | Chapman et al. | |
| 2005/0062603 A1 | 3/2005 | Fuerst et al. | |
| 2005/0065724 A1 | 3/2005 | Lee et al. | |
| 2005/0068179 A1 | 3/2005 | Roesner | |
| 2005/0083180 A1 | 4/2005 | Horwitz | |
| 2005/0088299 A1 | 4/2005 | Bandy et al. | |
| 2005/0092825 A1 | 5/2005 | Cox et al. | |
| 2005/0093678 A1 | 5/2005 | Forster et al. | |
| 2005/0093703 A1 | 5/2005 | Twitchell | |
| 2005/0099268 A1* | 5/2005 | Juels et al. | 340/10.4 |
| 2005/0110641 A1 | 5/2005 | Mendolia et al. | |
| 2005/0135181 A1 | 6/2005 | Shionoiri et al. | |
| 2005/0140511 A1 | 6/2005 | Bonnell et al. | |
| 2005/0143026 A1* | 6/2005 | Bellantoni | 455/121 |
| 2005/0143916 A1 | 6/2005 | Kim et al. | |
| 2005/0145688 A1 | 7/2005 | Milenkovic et al. | |
| 2005/0149414 A1 | 7/2005 | Schrodt et al. | |
| 2005/0154572 A1 | 7/2005 | Sweeney | |
| 2005/0155213 A1 | 7/2005 | Eastin | |
| 2005/0159913 A1 | 7/2005 | Ariyoshi et al. | |
| 2005/0162256 A1 | 7/2005 | Kinoshita | |
| 2005/0170784 A1 | 8/2005 | Ariyoshi et al. | |
| 2005/0177423 A1 | 8/2005 | Swanson | |
| 2005/0177466 A1 | 8/2005 | Willins | |
| 2005/0179521 A1 | 8/2005 | Pillai et al. | |
| 2005/0180566 A1 | 8/2005 | Ryal | |
| 2005/0188095 A1 | 8/2005 | Gardiner et al. | |
| 2005/0190098 A1 | 9/2005 | Bridgelall et al. | |
| 2005/0192727 A1* | 9/2005 | Shostak et al. | 701/37 |
| 2005/0197775 A1* | 9/2005 | Smith | 702/3 |
| 2005/0200457 A1 | 9/2005 | Bridgelall et al. | |
| 2005/0206552 A1 | 9/2005 | Friedrich | |
| 2005/0206555 A1 | 9/2005 | Bridgelall et al. | |
| 2005/0212660 A1 | 9/2005 | Hansen et al. | |
| 2005/0212673 A1 | 9/2005 | Forster | |
| 2005/0212676 A1 | 9/2005 | Steinberg | |
| 2005/0219039 A1 | 10/2005 | Allen | |
| 2005/0228528 A1 | 10/2005 | Farchmin et al. | |
| 2005/0231367 A1 | 10/2005 | Bellantoni | |
| 2005/0237162 A1 | 10/2005 | Hyde et al. | |
| 2005/0240305 A1 | 10/2005 | Bogash et al. | |
| 2005/0241548 A1 | 11/2005 | Muirhead | |
| 2005/0253717 A1 | 11/2005 | Howarth et al. | |
| 2005/0253718 A1 | 11/2005 | Droms et al. | |
| 2005/0258955 A1 | 11/2005 | Gloekler et al. | |
| 2005/0264401 A1* | 12/2005 | Haller et al. | 340/10.1 |
| 2005/0269407 A1 | 12/2005 | Harmon | |
| 2006/0006231 A1 | 1/2006 | Anson et al. | |
| 2006/0027658 A1 | 2/2006 | Genc et al. | |
| 2006/0038077 A1 | 2/2006 | Olin et al. | |
| 2006/0049250 A1 | 3/2006 | Sullivan | |
| 2006/0053234 A1 | 3/2006 | Kumar et al. | |
| 2006/0055508 A1 | 3/2006 | Kumar et al. | |
| 2006/0060657 A1 | 3/2006 | Choong et al. | |
| 2006/0071774 A1 | 4/2006 | Brown et al. | |
| 2006/0097873 A1 | 5/2006 | Vrba et al. | |
| 2006/0108411 A1 | 5/2006 | Macurek et al. | |
| 2006/0125653 A1 | 6/2006 | McQuade | |
| 2006/0125694 A1 | 6/2006 | Dejanovic et al. | |
| 2006/0145850 A1 | 7/2006 | Krstulich | |
| 2006/0161878 A1 | 7/2006 | Koh et al. | |
| 2006/0170565 A1 | 8/2006 | Husak et al. | |
| 2006/0200256 A1* | 9/2006 | Mason et al. | 700/65 |
| 2006/0208859 A1 | 9/2006 | Hougen et al. | |
| 2006/0229113 A1 | 10/2006 | Rowse | |
| 2006/0232382 A1* | 10/2006 | Bauer et al. | 340/10.1 |
| 2006/0250248 A1 | 11/2006 | Tu et al. | |
| 2006/0279412 A1 | 12/2006 | Holland et al. | |
| 2007/0008073 A1 | 1/2007 | Poasevara | |
| 2007/0013517 A1 | 1/2007 | Posamentier | |
| 2007/0013519 A1 | 1/2007 | Chung et al. | |
| 2007/0018820 A1 | 1/2007 | Chand et al. | |
| 2007/0035396 A1 | 2/2007 | Chand et al. | |
| 2007/0040681 A1 | 2/2007 | Jessup | |

| | | | |
|---|---|---|---|
| 2007/0055470 | A1 | 3/2007 | Pietrzyk et al. |
| 2007/0063029 | A1 | 3/2007 | Brandt et al. |
| 2007/0075128 | A1 | 4/2007 | Hall et al. |
| 2007/0075832 | A1 | 4/2007 | Morse et al. |
| 2007/0137531 | A1* | 6/2007 | Muirhead .................. 108/51.3 |
| 2007/0159311 | A1 | 7/2007 | Schober |
| 2007/0159331 | A1 | 7/2007 | Zegelin |
| 2007/0205860 | A1 | 9/2007 | Jones et al. |
| 2007/0205861 | A1 | 9/2007 | Nair et al. |
| 2008/0118378 | A1 | 5/2008 | Baron et al. |
| 2008/0278328 | A1 | 11/2008 | Chand et al. |
| 2009/0243808 | A1 | 10/2009 | Vrba et al. |
| 2009/0254199 | A1 | 10/2009 | Vrba et al. |

FOREIGN PATENT DOCUMENTS

| | | |
|---|---|---|
| CN | 1801714 A | 7/2006 |
| CN | 1952950 A | 4/2007 |
| CN | 101300609 A | 11/2008 |
| CN | 101356543 A | 1/2009 |
| CN | 100512117 C | 7/2009 |
| DE | 10314260 A1 | 10/2004 |
| EP | 1542105 A | 6/2005 |
| EP | 1 557 806 A2 | 7/2005 |
| EP | 1557806 A2 | 7/2005 |
| EP | 1 657 609 A1 | 11/2005 |
| EP | 1 657 606 A1 | 5/2006 |
| EP | 1 750 185 A2 | 2/2007 |
| EP | 1 752 908 A2 | 2/2007 |
| EP | 1 772 812 A2 | 4/2007 |
| EP | 1 657 609 B1 | 3/2010 |
| JP | 06-119501 | 4/1994 |
| JP | 2001-126038 | 5/2001 |
| JP | 2003-195914 | 7/2003 |
| JP | 2004-078656 | 3/2004 |
| JP | 2005-157806 | 6/2005 |
| JP | 2005-174099 | 6/2005 |
| JP | 2005-176713 | 7/2005 |
| JP | 2005-196235 | 7/2005 |
| WO | 0016289 | 3/2000 |
| WO | 0058752 | 10/2000 |
| WO | WO00/65551 | 11/2000 |
| WO | 0169516 | 9/2001 |
| WO | 01/82009 A2 | 11/2001 |
| WO | 02073523 | 9/2002 |
| WO | 02/101670 A2 | 12/2002 |
| WO | 03056403 A | 7/2003 |
| WO | 03056469 A | 7/2003 |
| WO | 2004/040387 A | 5/2004 |
| WO | 2005045743 A | 5/2005 |
| WO | 2005098737 A2 | 10/2005 |
| WO | 2007 021648 A2 | 2/2007 |
| WO | 2007/030394 A | 3/2007 |
| WO | 2007/030544 A2 | 3/2007 |
| WO | 2007/030544 A3 | 3/2007 |
| WO | 2008063553 A2 | 5/2008 |

OTHER PUBLICATIONS

OA Dated May 30, 2008 U.S. Appl. No. 11/222,256, 60 pages.
International Search Report for PCT Application No. PCT/US06/34290, mailed Feb. 5, 2008, 2 pages.
International Search Report dated May 17, 2006 for International Patent Serial No. PCT/EP2005/007878, 8 pages.
European Search Report dated Feb. 6, 2006 mailed Feb. 20, 2006 for European Patent Application Serial No. 10/985,173, 3 Pages.
M. Karkkainen, et al.: "The product centric approach: a solution to supply network information management problems?" Computers in Industry, Elsevier Science Publishers. Amsterdam, NL, vol. 52, No. 2, Oct. 2003.
European Search Report dated Feb. 14, 2006 mailed Feb. 20, 2006 for European Patent Application Serial No. 10/985,621, 3 Pages.
Partial International Search Report dated Mar. 30, 2006, for PCT Application Serial No. PCT/EP2005/007878, 3 pages.
OA Dated Aug. 8, 2008 for U.S. Appl. No. 11/241,421, 49 pages.
OA Dated Aug. 28, 2008 for U.S. Appl. No. 11/129,199, 28 pages.
OA Dated Apr. 28, 2008 for U.S. Appl. No. 11/220,130, 29 pages.
OA Dated May 30, 2008 for U.S. Appl. No. 11/222,256, 60 pages.
OA Dated Apr. 30, 2008 for U.S. Appl. No. 11/185,114, 80 pages.
International Search Report for PCT Application Serial No. PCT/US06/34290, mailed Feb. 5, 2008, 2 pages.
OA Dated Jan. 30, 2009 for U.S. Appl. No. 11/129,199, 32 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Sep. 18, 2008 for U.S. Appl. No. 11/190,143, 22 pages.
OA Dated Sep. 30, 2008 for U.S. Appl. No. 11/230,758, 63 pages.
OA Dated Feb. 6, 2009 for U.S. Appl. No. 11/241,421, 14 pages.
OA Dated Oct. 2, 2008 for U.S. Appl. No. 11/185,114, 42 pages.
International Search Report for PCT Application Serial No. PCT/US06/34721 mailed Apr. 26, 2007, 1 page.
OA Dated Apr. 16, 2009 for U.S. Appl. No. 11/230,758, 26 pages.
OA Dated Apr. 21, 2009 for U.S. Appl. No. 11/190,143, 19 pages.
CN OA Dispatched Jul. 4, 2008 for Chinese Application No. 200610141407.1, 12 pages.
EPOA dated Mar. 19, 2009 for European Patent Application No. 05 776 159.5, 3 pages.
EPOA dated Aug. 20, 2008 for European Patent Application No. 05 776 159.5, 3 pages.
International Search Report dated May 17, 2006 for PCT Application No. PCT/EP2005/007878, 8 pages.
OA dated Jun. 4, 2009 for U.S. Appl. No. 11/185,114, 95 pages.
OA dated May 14, 2009 for U.S. Appl. No. 11/239,959, 37 pages.
OA dated Aug. 2, 2009 for U.S. Appl. No. 11/239,959, 34 pages.
OA Dated Jul. 28, 2009 for U.S. Appl. No. 11/220,130, 32 pages.
OA dated Jul. 30, 2009 for U.S. Appl. No. 12/263,750, 65 pages.
OA Dated Aug. 26, 2009 for U.S. Appl. No. 11/241,421, 24 pages.
OA dated Sep. 21, 2009 for U.S. Appl. No. 11/190,143, 27 pages.
OA dated Oct. 27, 2009 for U.S. Appl. No. 11/230,758, 39 pages.
CNOA due Apr. 1, 2008 for Chinese Patent Application No. 200510137387.6, 21 pages.
OA dated Jan. 7, 2010 for U.S. Appl. No. 12/040,305, 78 pages.
European Search Report dated Nov. 20, 2009 for European Patent Application No. EP 06 80 3042, 7 pages.
OA dated Dec. 24, 2009 for U.S. Appl. No. 12/140,118, 76 pages.
OA dated Jan. 27, 2010 for U.S. Appl. No. 11/185,114, 88 pages.
OA dated Jan. 13, 2010 for U.S. Appl. No. 12/263,750, 16 pages.
OA dated Mar. 1, 2010 for U.S. Appl. No. 11/239,959, 29 pages.
OA dated Apr. 15, 2010 for U.S. Appl. No. 11/241,421, 23 pages.
OA dated Jun. 23, 2010 for U.S. Appl. No. 12/040,305, 30 pages.
OA dated Jun. 18, 2010 for U.S. Appl. No. 12/140,118, 13 pages.
Partial European Search Report dated Nov. 3, 2008 for European Patent Application No. EP 06 01 5620, 5 pages.
International Search Report mailed Jun. 5, 2008 for PCT Application No. PCT/US2007/024049, 1 page.
European Search Report dated Jun. 9, 2008 for European Patent Application No. EP 06 02 0479, 2 pages.
International Search Report mailed Mar. 14, 2007 for PCT Application No. PCT/US2006/030751, 2 pages.
CN OA dated Aug. 13, 2010 for Chinese Application No. 200680029337.9, 7 pages.
OA dated Oct. 25, 2010 for U.S. Appl. No. 12/040,305, 23 pages.
Notice of Allowance dated Apr. 1, 2011 for U.S. Appl. No. 12/481,965, 81 pages.
OA dated Aug. 8, 2011 for U.S. Appl. No. 12/403,225, 88 pages.
JP OA, mailed Nov. 29, 2011, for Japanese Patent Application No. 2008-526111, 8 pages. (English Translation).

* cited by examiner

ENHANCED CONTROLLER UTILIZING RFID TECHNOLOGY

TECHNICAL FIELD

The claimed subject matter is related to RFID technology, and more specifically to RFID tags utilized within an industrial automation system.

BACKGROUND

An evolving technology that is rapidly gaining interest is Radio Frequency Identification (RFID), which leverages electronic data to mitigate data reading (e.g., scanning bar codes) and/or opening containers to obtain product information. RFID technology leverages electronic data and wireless communications for identification purposes. With RFID systems, electronic data typically is stored within an RFID tag, which can be formed from a small silicon chip and one or more antennas and affixed to a product. Reading from and/or writing to an RFID tag can be achieved through radio frequency (RF) based wireless communication via devices referred to as RFID readers. An RFID reader is a device that can be utilized to read and/or write RFID tag data, depending on read/write privileges.

In general, writing is utilized to add and/or modify product-specific information to an RFID tag, and reading is utilized to retrieve the information, for example, to provide for automatic product identification. In many instances, the electronic data written to and/or read from an RFID tag includes an Electronic Product Code (EPC), as well as other product-related data. The EPC, in general, is a unique number that is encoded (e.g., as a bit code) and embedded within the RFID tag (a small silicon chip with one or more antennas) affixed to an associated product. Typical EPC data can include information about the associated product (e.g., product type, date of manufacture, lot number, source data, destination data, unique product code, . . . ) and/or associated pallets, boxes, cases and/or container levels, for example.

In today's highly sophisticated, complex and intelligent industrial automation systems, RFID technology is becoming an increasingly important presence for logistics concerns, material handling and inventory management. Simply knowing that an object exists in a large warehouse is no longer sufficient. When implementing an RFID solution in a distribution center or a factory, it is customary to utilize three distinct platforms: an RFID reader/antenna (e.g., a fixed implementation), RFID "middleware" software running on a standard PC (Personal Computer), and an industrial controller (e.g., a PLC—Programmable Logic Controller). A traditional communications approach is to have the RFID reader connect to the controller via a network using, for example, RS-232 serial communications, Ethernet, or any of the field buses such as DeviceNet, ControlNet, etc. Thus, data read from the RFID tag can be utilized to provide a greater degree of certainty over what goes into a supply chain and how to manage raw materials, warehouse inventory, shipments, logistics, and/or various other aspects of manufacturing.

In general, an RFID system can include multiple components: tags, tag readers (e.g., tag transceivers), tag writers, tag-programming stations, circulation readers, sorting equipment, tag inventory wands, etc. Moreover, various makes, models, types, and/or applications can be associated with respective components (e.g., tag, tag readers, tag programming stations, circulation readers, sorting equipment, tag inventory wands, . . . ), which can complicate compatibility within the RFID system and automation systems. In view of the above, there is a need to provide a uniform way to incorporate various makes, models, types, and/or applications into disparate automation system utilizing RFID technology.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing RFID technology with automation systems and/or applications. An RFID component can transfer a data stream from an RFID tag via wireless communication, wherein the RFID tag can include data associated with a particular object and/or item (not shown). The RFID tag can be either an active RFID tag or a passive RFID tag. The RFID component can be, but is not limited to, various components that read, write, receive, and/or store electronic product data, such as, readers, readers/writers, writers and/or servers, and can be a handheld device or a fixed-mount device depending on the particular application. A controller can utilize the data stream associated with the RFID component. The controller can contain software components and hardware components having inputs and/or outputs that can be utilized in connection with automating an industrial manufacturing device and/or process.

Moreover, the controller can integrate and/or embed middleware that can filter the data stream associated with the RFID component, wherein such filtering can extract relevant information from such data. With the integration of middleware into the controller, the controller can provide a seamless implementation of a portion of a plurality of disparate RFID components. For instance, the controller with integrated middleware can provide at least one of human machine interfacing, programming, configuration, sharing of data streams, data stream regulation, and/or employment of at least one sensor associated with the controller. In addition, the middleware can provide clock synchronization between at least the controller and the RFID component.

In accordance with one aspect of the claimed subject matter, the controller can integrate and/or embed RFID software to facilitate providing software functionality to the RFID component. The RFID software can incorporate at least one of demodulation, decoding, and/or conversion of data streams into the controller. Moreover, by incorporating the RFID software into the controller, the RFID software is implemented in a more industrial hardened platform and/or environment.

In accordance with another aspect of the claimed subject matter, the controller can integrate a smart component that connects to an existing RFID component to provide enhanced functionality thereto. The smart component can provide additional analog and/or digital inputs and/or outputs. Moreover, the smart component can employ additional capabilities such as, but not limited to networking and location determination. The smart component can be, for instance, a micro PLC and/or a controller that provides a common programming language between at least a portion of a plurality of disparate RFID components. In other aspects of the claimed subject matter, methods are provided that facilitate utilizing RFID technology and a controller to provide efficient and/or optimized utilization of RFID components.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
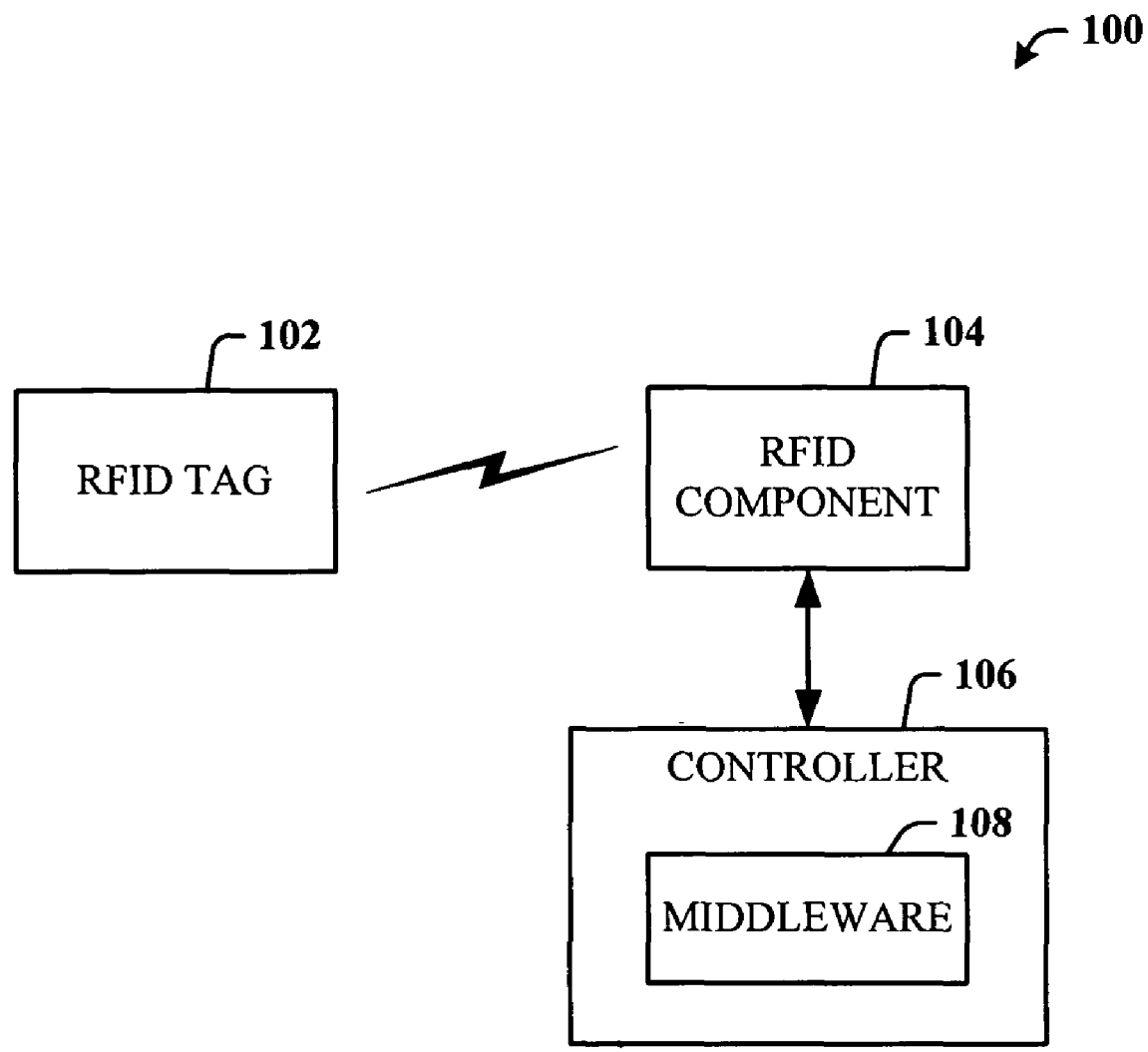
FIG. 1 illustrates a block diagram of an exemplary system that facilitates utilizing RFID technology with a controller.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates utilizing RFID technology with a controller. An RFID component 104 can transfer a data stream from an RFID tag 102 via wireless communication, wherein the RFID tag 102 can include data associated with a particular object and/or item (not shown). Moreover, the RFID tag 102 can be either an active RFID tag or a passive RFID tag. The RFID component 104 can be, but is not limited to, various components that read, write, receive, and/or store electronic product data, such as, readers, readers/writers, writers and/or servers, and can be a handheld device or a fixed-mount device depending on the particular application. A controller 106 can utilize the data stream associated with the RFID component 104. The controller 106 can contain software components and hardware components having inputs and/or outputs that can be utilized in connection with automating an industrial manufacturing device and/or process.

Furthermore, the controller 106 can include integrated middleware 108 that eliminates any need for a computer and/or personal computer (PC) to host any suitable middleware software associated with the RFID component 104. By integrating the middleware 108 into the controller 106 provides an efficient, inexpensive, and industrial hardened solution in comparison with conventional techniques. The middleware 108 can filter the data stream associated with the RFID component 104, wherein such filtering can extract relevant information from such data. The middleware 108 can further provide the efficient implementation of the RFID component 104 based at least in part upon information included with the controller 106. In addition, the middleware 108 can orchestrate the sharing of information from multiple RFID components related to a plurality of RFID tags. For instance, the middleware 108 can provide any suitable format to data streams associated with disparate RFID components 104. Thus, based at least in part upon the controller 106 having integrated middleware 108, disparate RFID components 104 regardless of brand, type, make, etc. can seamlessly be utilized by such controller 106 and middleware 108.

For instance, the middleware 108 can be software that filters a data stream from an RFID reader, wherein such middleware 108 is integrated into the controller 106 to provide at least one of the elimination of a separate computer to host such software; and the accessibility to various information from the controller 106 such as the location of the reader (e.g., factory, warehouse, . . . ). In one example, the controller 106 can utilize various sensors, wherein cases (having RFID tags) on a conveyor belt can be located utilizing one of the sensors. The sensor data can indicate the location of particular case on the conveyor belt and such information (contained in the controller 106) can contribute to the middleware 108 filtering of the data streams. By utilizing the information related to the controller 106 in conjunction with the integrated middleware 108, the RFID component 104 can be effectively and/or efficiently implemented to receive data streams from RFID tags.

In another example, the controller 106 can integrate RFID software that can provide software functionality to the RFID component 104 (discussed in more detail infra). The software functionality can include demodulating functions, decoding functions, conversion functions associated with the data stream collected by the RFID component 104. Moreover, the controller 106 can include a smart component (not shown) that connects to the RFID component 104 to provide enhanced functionality including, for instance, various inputs, outputs, programming language, network capabilities, location information, etc.

Figure 2:
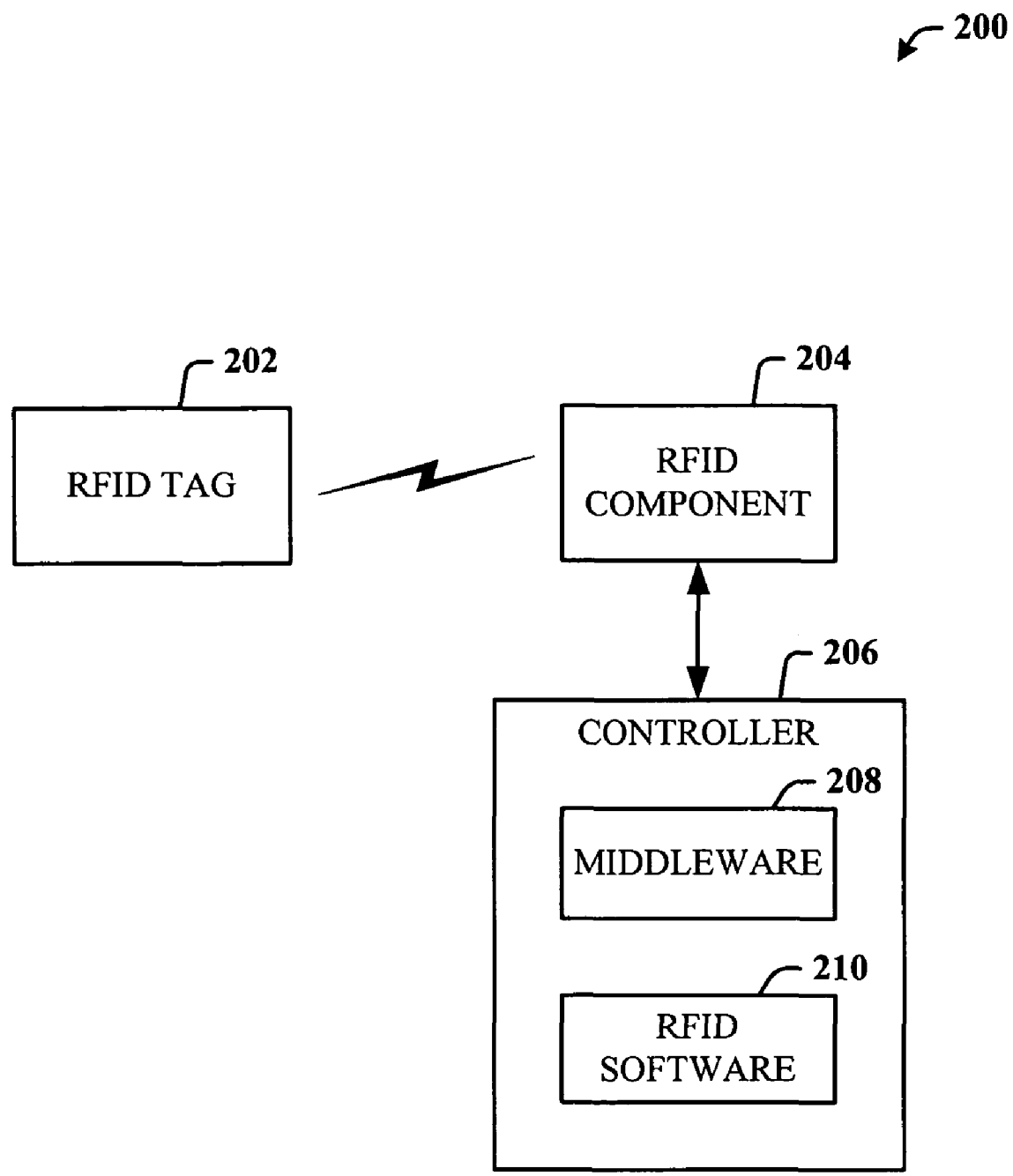
FIG. 2 illustrates a block diagram of an exemplary system that facilitates implementing seamless integration of a plurality of disparate RFID components via a single controller.

FIG. 2 illustrates a system 200 that facilitates implementing seamless integration of a plurality of disparate RFID components via a single controller. An RFID tag 202 can include data, wherein an RFID component 204 can receive the data stream via wireless communication. The data stream can be utilized by a controller 206, wherein the controller 206 integrates middleware 208. The middleware 208 within the controller 206 provides 1) the elimination of a separate computer to host middleware that filters data and extracts relevant information from the data stream; and 2) contributes to the filtering of the data stream utilizing information associated with the system 200. It is to be appreciated that the RFID tag 202, RFID component 204, controller 206, and middleware 208 can be substantially similar to the RFID tag 102, RFID component 104, controller 106, and middleware 108 of FIG. 1 respectively.

For example, the controller 206 with integrated middleware 208 optimizes the utilization of any RFID component 204 that receives a data stream from the RFID tag 202. The middleware 208 can provide various filtering techniques and/or software that allow the data streams to be cleansed (e.g., extracting relevant information from the data stream). Moreover, with the integration of the middleware 208 into the controller 206, the information included with the controller 206 can be utilized to determine collection of data streams from the RFID component 204. It is to be appreciated that the integration of the middleware 208 into the controller 206 can further provide configuration, visualization, and/or information sharing for a plurality of disparate RFID components.

The controller 206 can further include RFID software 210 that can facilitate enhancing the functionality of the RFID component 204. The RFID software 210 within the controller 206 can include demodulation, decoding, conversion techniques suitable to be employed on the data stream associated with the RFID component 204. Moreover, the implementation of the RFID software 210 in the controller 206 can provide an industrial hardened platform. By integrating the RFID software 210 into the controller 206, there is a reduction in additional physical infrastructure on a plant and/or warehouse floor.

For example, a plurality of RFID readers can be located on a plant floor, wherein conventionally the individual RFID readers would respectively be responsible for demodulating, decoding, and/or converting the data stream received which can be inefficient. Yet, the controller 206 with the integrated RFID software 210 alleviates this problem by pulling the software functionality from the RFID readers into the controller 206 which is considered an industrially hardened platform. Thus, the plant floor infrastructure can be reduced and improved based at least in part upon the consolidation of the RFID software 210 into the controller 206.

Figure 3:
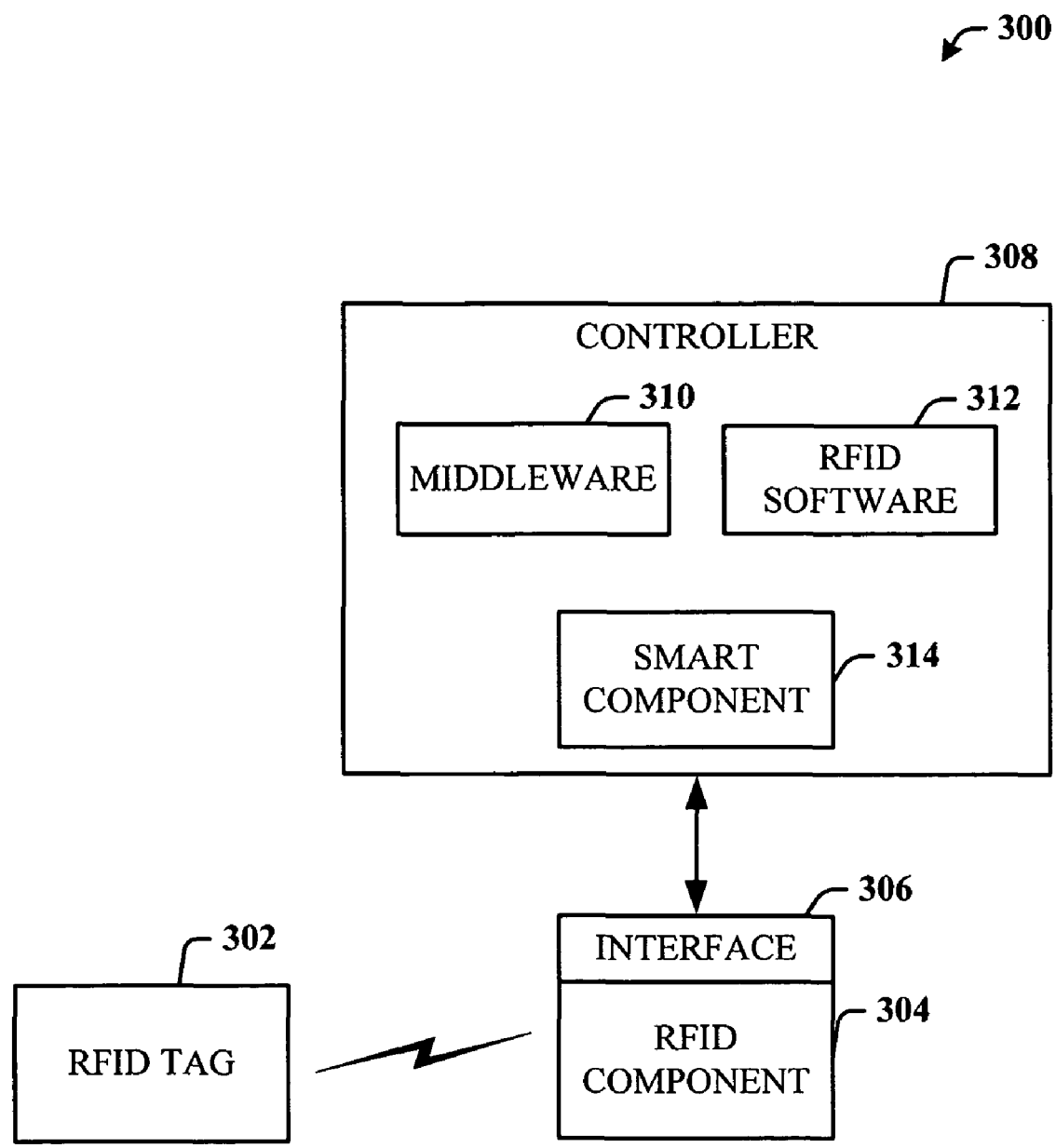
FIG. 3 illustrates a block diagram of an exemplary system that facilitates enhancing an RFID component utilizing a controller.

FIG. 3 illustrates a system 300 that facilitates enhancing an RFID component utilizing a controller. An RFID component 304 can interact via wireless communication with an RFID tag 302, wherein the RFID component 304 can receive a data stream associated therewith. The RFID component 304 can further utilize an interface 306 to provide the data stream to a controller 308. The controller 308 can integrate middleware 310 that provides at least the filtering of the data stream associated with the RFID component 304. Furthermore, the controller can include integrated RFID software 312 that can invoke software functionality for any RFID component 304 regardless of make, model, brand, etc. It is to be appreciated that the RFID tag 302, RFID component 304, controller 308, middleware 310, and RFID software 312 can be substantially similar to components, tags, controllers, middleware, and RFID software described in previous figures.

Moreover, the system 300 can include any suitable and/or necessary interface component 306, which provides various adapters, connectors, channels, communication paths, etc. to integrate the RFID component 304 into virtually any operating and/or database system(s). In addition, the interface component 306 can provide various adapters, connectors, channels, communication paths, etc., that provide for interaction with the RFID component 304, the controller 308, and any components and/or data associated therewith.

The controller 308 further includes a smart component 314 that can connect to the RFID component 304 to provide enhanced functionality. Although the smart component 314 is depicted as an internal component in relation to the controller 308, it is to be appreciated that the smart component 314 can be incorporated into the controller 308, a stand-alone component, a combination thereof, and/or the controller 308. In other words, the smart component 314 can be a controller substantially similar to the controller 308 in order to provide the described enhanced functionality.

The smart component 314 can connect to the RFID component 304, wherein configuration and/or user information can be received. The smart component 314 can connect to the RFID component 304 utilizing, for instance, an existing interface. Moreover, the smart component 314 can provide programmability, inputs, outputs, networking capabilities, location capabilities, program languages, etc. It is to be appreciated that the smart component 314 can provide an enhanced and/or increased functionality in regards to the RFID component 304 before connection of such smart component 314.

Figure 4:
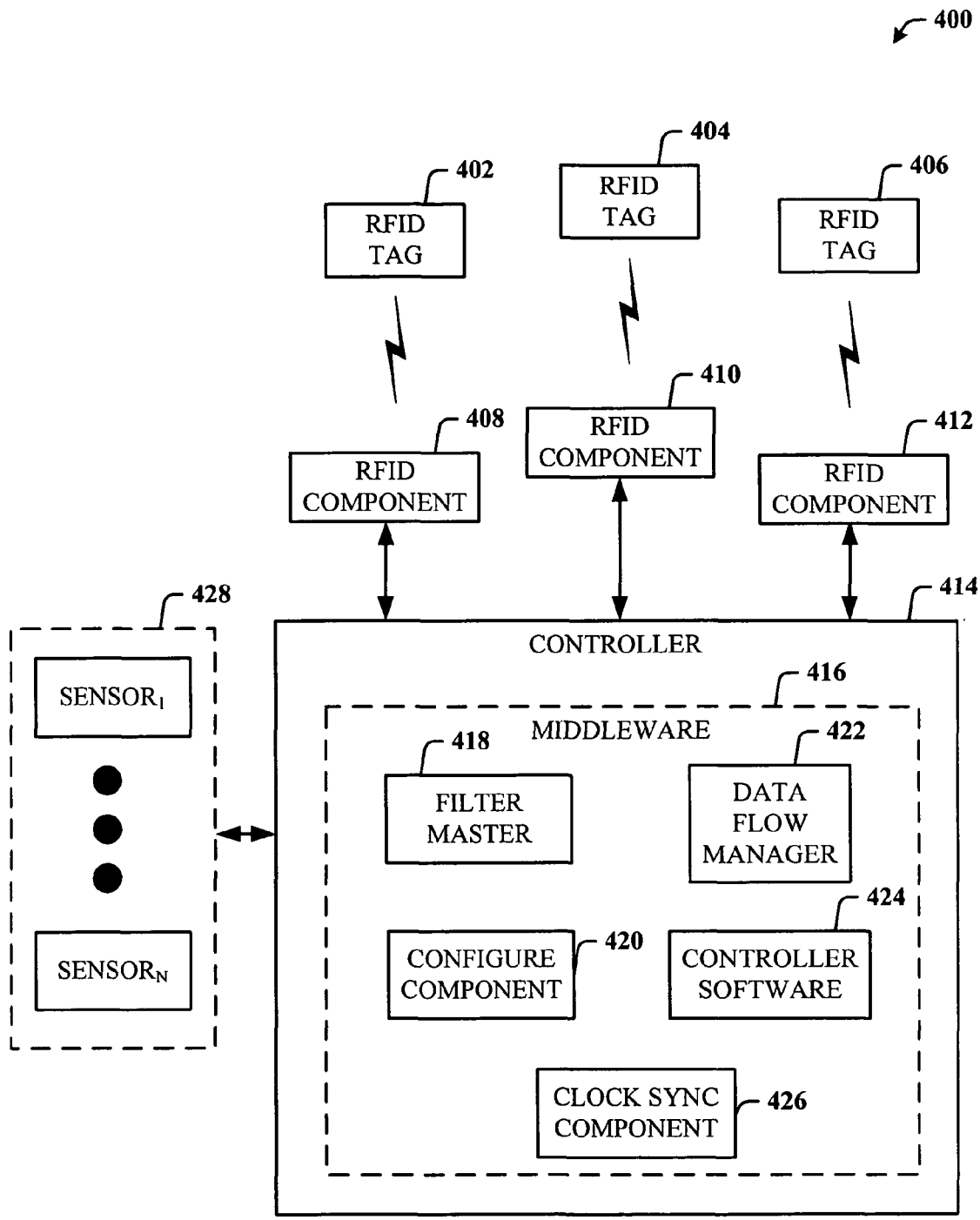
FIG. 4 illustrates a block diagram of an exemplary system that facilitates integrating middleware with a controller to provide seamless integration with a plurality of disparate RFID components.

FIG. 4 illustrates a system 400 that facilitates integrating middleware with a controller to provide seamless integration with a plurality of disparate RFID components. RFID tags 402, 404, and 406 can relate to a specific good, article, object, item, pallet, box, etc. and communicate via wireless communication to at least one of the RFID components 408, 410, and 412. It is to be appreciated that various brands, makes, and/or models of RFID tags 402, 404, and 406 and RFID components 408, 410, and 412 exist and any suitable RFID tag and RFID component can be utilized in accordance with the claimed subject matter. For instance, RFID tag 402 can be an active RFID tag, while RFID tag 404 and 406 can be passive RFID tags. Moreover, the RFID component 408 can be a reader of brand X, while RFID component 410 is a reader/writer of brand Z and RFID component 412 is a writer of brand Y.

A controller 414 can receive data streams associated with the RFID components 408, 410, and 412. It is to be appreciated and understood that the controller 414 can contain software components and hardware components having inputs and/or outputs that can be utilized in connection with automating an industrial manufacturing device and/or process. The controller 414 can be common to a plurality of RFID components (408, 410, and 412) in various locations. Moreover, the controller 414 can integrate middleware 416 to provide at least 1) the elimination of a designated host for middleware software associated with the RFID components 408, 410, and 412; and 2) the controller 414 to contribute to the filtering of the data streams. The middleware 416 can orchestrate the sharing of information among a plurality of RFID components 408, 410, and 412. For instance, the middleware 416 can compare signal strengths associated with various RFID readers when one object is within range of such RFID readers.

The middleware 414 can include a filter master 418 that can interface with a plurality of disparate RFID components 408, 410, and 412. Although three RFID components are depicted in FIG. 4, it is to be understood that any number of RFID components can be utilized in accordance with the subject innovation. The filter master 418 can provide common filtering software adapted to disparate RFID components 408, 410, and 412. The filter master 418 can utilize various filtering techniques and/or any suitable filtering mechanisms in conjunction with the RFID components 408, 410, and 412.

The middleware 416 can further include a configure component 420 that can provide configuration of the plurality of disparate RFID components 408, 410, and 412. The configure component 420 can be any suitable configuration associated with implementing RFID components over, for example, a network such as Ethernet to the controller 414. For instance, the configure component 420 can provide a universal programming for various RFID components in various locations. Moreover, the configure component 420 can facilitate integrating RFID components into the controller 414 with middleware 416 by providing at least one of configuration, programming, and human machine interface (HMI). In other words, the configure component 420 can provide a universal configuration and visualization environment to set up RFID components 408, 410, and 412 connected to the controller 414.

The controller 414 with integrated middleware 416 can also include a data flow manager 422. The data flow manager 422 can monitor and/or provide limitations in relation to the number of bytes sent from at least one RFID component in a transaction. For instance, the bytes of data can be from tag by tag, an array, etc. In another example, the RFID component can be informed that controller data (e.g., data streams associated with a particular RFID component or a portion of RFID components) is available, wherein the data flow manager 422 can specify the size of packets that it is to receive.

The middleware 416 can include controller software 424 that enables the controller 414 to interact with the system 400. The controller software can be utilized to infer the type of package, object, and/or item associated with an RFID tag that communicated with the RFID components 408, 410, and 412. For example, the controller 414 can receive data from a plurality of sensors 428, wherein there can be 1 to N sensors, with N being an integer greater than or equal to 1. The controller software 424 can be implemented to interact with the filter master 418 to enhance the filtering of the data streams. For instance, when communicating with the middleware 416 for collecting RFID tag data, the controller 414 can utilize a data buffer to accommodate multi-byte, asynchronous data transfer with the middleware 416.

In one example, the plurality of sensors 428 can be connected to the controller 414 to provide the controller 414 information associated with a package, item, object (e.g., any object associated with an RFID tag) location in relation to an RFID component. The controller 414 can then activate and/or de-activate RFID components based at least in part upon the plurality of sensors 428 and respective data. In other words, by utilizing the controller 414 and related sensors 428, the amount of erroneous and/or unnecessary data reads from the RFID components 408, 410, and 412 is minimized.

The controller 414 with integrated middleware 416 can further include a clock sync component 426 that invokes clock synchronization between any components associated with the system 400. In particular, the clock sync component 426 can synchronize the clock associated with the controller 414 with the clock associated with the RFID components 408, 410, and 412. By synchronizing the clocks within the system 400, complete synchronization is enabled to facilitate tracking, diagnostics, efficiency, etc. Moreover, the RFID components can share real-time data such as signal strengths, time stamps, etc.

The following example is one illustration on the possible implementation of the claimed subject matter. It is to be appreciated that the following is an example, and the subject innovation is not to be so limited. The middleware 416 can be hosted in a plug-in module in the controller 414 backplane. In another instance, the middleware can utilize an open socket associated with a network (e.g., Ethernet, . . . ). The module can provide an Ethernet interface to the RFID component and a computing engine for the middleware 416. The controller 414 can communicate over the backplane, dedicated network, and/or the open socket with the middleware 416 to enhance the filtering capability with information about the tagged object.

Figure 5:
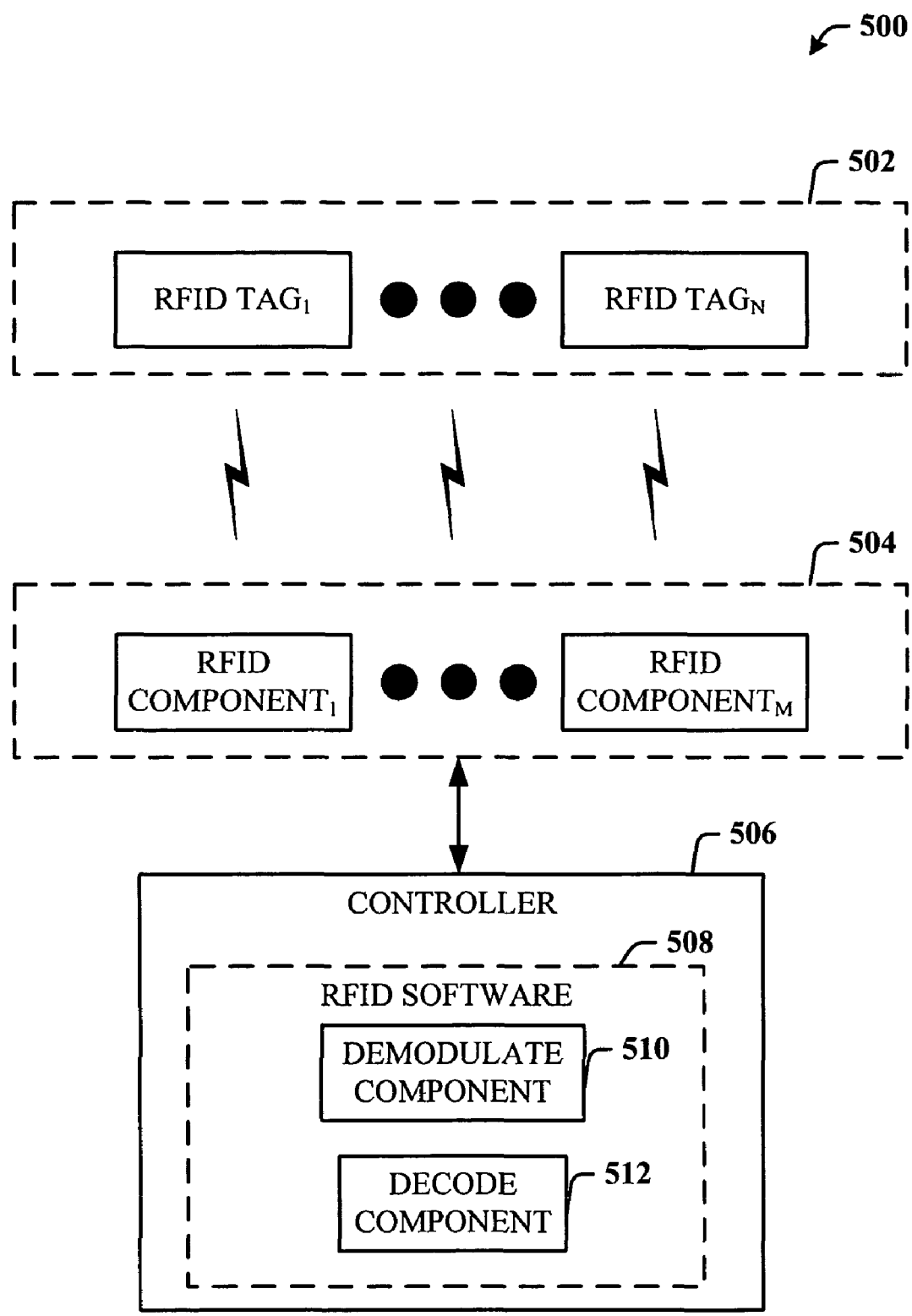
FIG. 5 illustrates a block diagram of an exemplary system that facilitates automatically providing RFID component functionality via software to a plurality of disparate RFID components.

FIG. 5 illustrates a system 500 that facilitates automatically providing RFID component functionality via software to a plurality of disparate RFID components. A plurality of RFID tags 502 can transfer data streams via wireless communication to a plurality of RFID components 504. There can be 1 to N RFID tags, where N is an integer greater or equal to 1. Similarly, there can be 1 to M RFID components, where M is an integer greater or equal to 1. The data streams associated with the RFID components 504 can be received by a controller 506 that includes integrated RFID software 508. It is to be appreciated that the controller 506 and the RFID software 508 can be substantially similar to the controller and RFID software previously described above.

The RFID software 508 can include hardware reader functions embodied into the controller as, for instance, code. The RFID software 508 can provide software functionality that conventionally exists inside at least one RFID component, wherein such software functionality can be pulled into the controller 506 to enable an industrially hardened platform. By integrating the RFID software 508 into the controller 506, infrastructure can be reduced, RFID component collisions (e.g., reads, writes, reads/writes, . . . ) and tag collisions are reduced. Moreover, the RFID software 508 enables an aggregate and/or distributed control of the plurality of RFID components 504 utilizing a single interface.

Additionally, the RFID software 508 can include at least one of a demodulate component 510 and a decode component 512. The demodulate component 510 can provide various demodulation techniques that can be implemented with the system 500 and/or data streams associated with the plurality of RFID components 504. The decode component 512 can provide various decoding techniques that can be utilized in association with the data streams related to the plurality of RFID tags 502. It is to be appreciated that the demodulate component 510 and/or the decode component 512 can provide any suitable conversion technique associated with analog signal to binary information and vice-versa.

Figure 6:
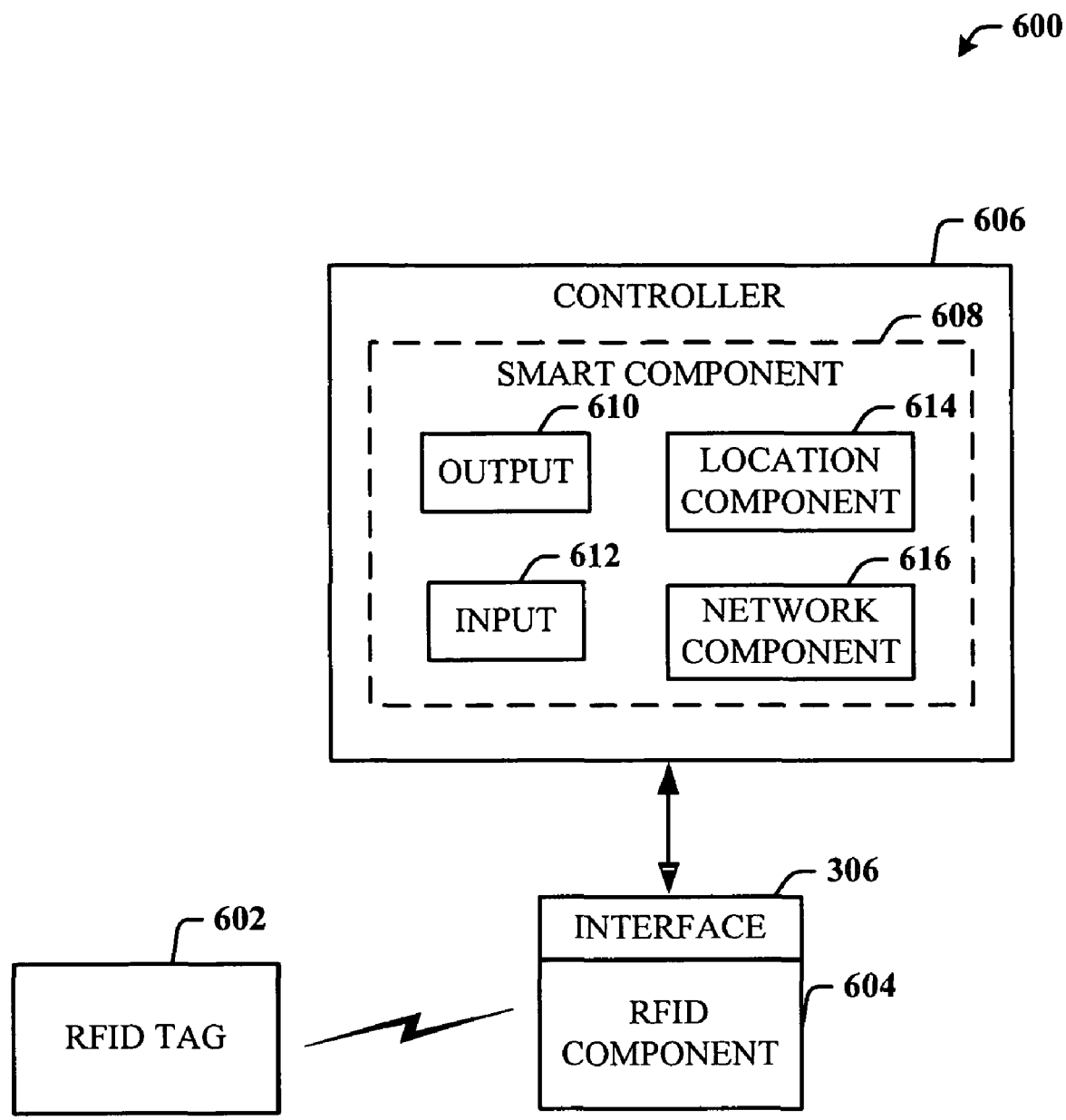
FIG. 6 illustrates a block diagram of an exemplary system that facilitates enhancing an RFID component with a controller.

FIG. 6 illustrates a system 600 that facilitates enhancing an RFID component with a controller. An RFID tag 602 can communicate through wireless communication to an RFID component 604, wherein such data associated therewith can be received to a controller 606. The controller 606 can integrate a smart component 608 that can connect to the RFID component 604 to provide enhanced functionality. The smart component 608 can further provide a universal programming for the RFID component 604 utilizing, for instance, a common programming language. In one example, the smart component 608 can communicate via a serial port, an open socket associated with an Ethernet port, and/or an Ethernet port. For instance, the smart component 608 and/or controller 606 can open an Ethernet port to access the data stream associated with the RFID component 604. In addition, the smart component 608 can provide universal connection to a plurality of disparate RFID components regardless of the communication protocol utilized by the particular RFID component 604.

The smart component 608 can further enhance the RFID component 604 by providing at least one additional output 610 and/or additional input 612. For instance, the smart component 608 can provide digital and/or analog inputs and/or outputs. Such input 612 and/or output 610 can be utilized with an application to trigger or set points of external devices such as, for instance, tower lights, etc. An analog input 612 and/or an analog output 610 can be utilized to change the RFID component 604 configuration (e.g., antenna reading strength, . . . ). Furthermore, the smart component 608 can provide a location component 614 that can add location information to the system 600 by utilizing, for instance, any location sensor (e.g., global positioning system (GPS), . . . ). Additionally, the smart component 608 can provide a network component 616 that provides additional networking capabilities to the user such as, but not limited to, Ethernet/IP, Modbus/TCP, ProfiNet, etc.

The following example is one illustration on the possible implementation of the claimed subject matter. It is to be appreciated that the following is an example, and the subject innovation is not to be so limited. The smart component 608 can connect to an existing RFID component 604 utilizing the serial, open socket, and/or Ethernet port to communicate with the RFID component's micro processor. The RFID component 604 can be configured and receive user information accordingly. The communication protocol employed over the connection to the RFID component 604 can be previously defined by, for example, the RFID component manufacturer. By utilizing the smart component 608 to connect to an existing RFID component 604, the combination can be referred to as a micro controller and/or PLC that provides a common programming language.

Figure 7:
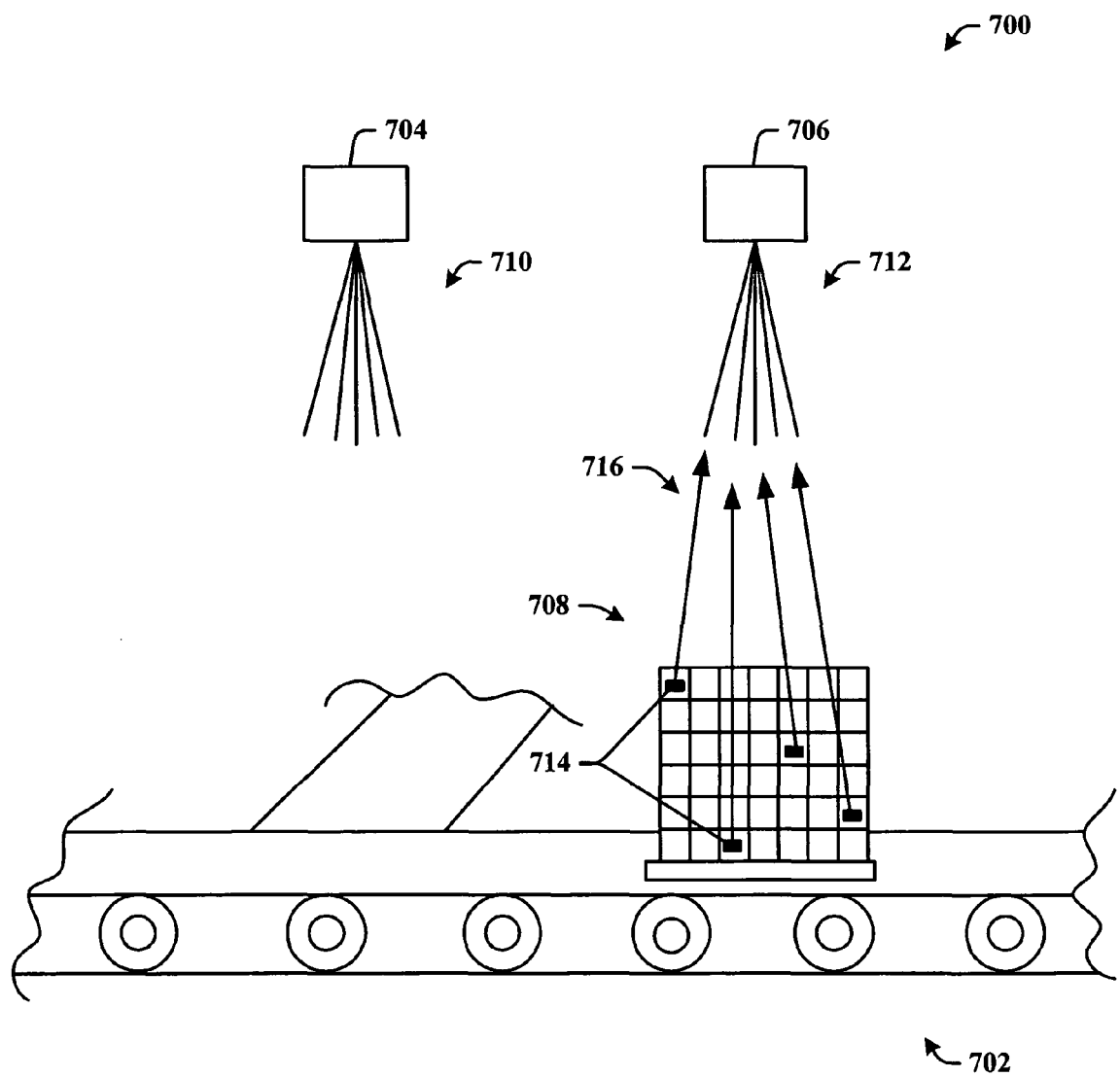
FIG. 7 illustrates an application of an RFID system in accordance with at least one aspect of the claimed subject matter.

FIG. 7 illustrates an application of an RFID system 700 in accordance with at least one aspect of the claimed subject matter. While FIG. 7 illustrates products being moved by a conveyor belt system 702, it will be appreciated that the claimed subject matter works equally well in other applications such as a forklifts, trucks, line, manual movement of goods, etc. A plurality of RFID R/W devices (a first reader 704, and a second reader 706) are employed to detect the presence of a plurality of RFID tags. While the RFID devices (704 and 706) are shown as overhead devices, it should be understood that the devices can be located anywhere, provided the range of coverage is appropriate for the particular purpose. For example, the devices (704 and 706) can be underneath, on the side and or in various locations throughout the environment. Each of the RFID R/W devices (704 and 706) transmits respective signals (710 and 712) that can be constant, intermittent, or periodically transmitted, such as when activated by a sensor device.

As a pallet of products 708 is moved (e.g., by a conveyor belt system 702 or other suitable means), the products move within the read range of the second RFID R/W reader 706. RFID tags associated with respective products, a few of which are illustrated at 714, are activated by the corresponding emitted signal 712, and respond via respective return signals 716 communicated to the second RFID R/W device 706. As the conveyor belt system 702 and associated pallet of products 708 move though the environment, the products enter the range of the first RFID R/W device 704, and the associated return signals will be transmitted in a similar manner. As the pallet of products 708 is moving, the RFID tags are constantly activated (for passive devices) and providing information concerning at least one parameter associated with the RFID R/W device (e.g., signal strength, origin, . . . ) and/or operating conditions.

A controller can be utilized such that the integration of at least one of middleware that filters the data stream associated with the RFID component; RFID software that provides RFID component software functionality; and a smart device that connects to the RFID component can provide a universal controller adapted to any RFID component regardless of make, model, and/or brand. For instance, the controller with integrated middleware can eliminate a separate computer and/or PC for the filtering software and allow the controller and various information associated therewith (e.g., sensor information, . . . ) to contribute to filtering of such data streams received from the device 704 and 706. Moreover, the controller can integrate RFID software that can pull demodulating and/or decoding techniques into the controller rather than in the devices 704 and 706. The controller can also utilize a smart component to enhance the ability of the devices 704 and 706.

Figure 8:
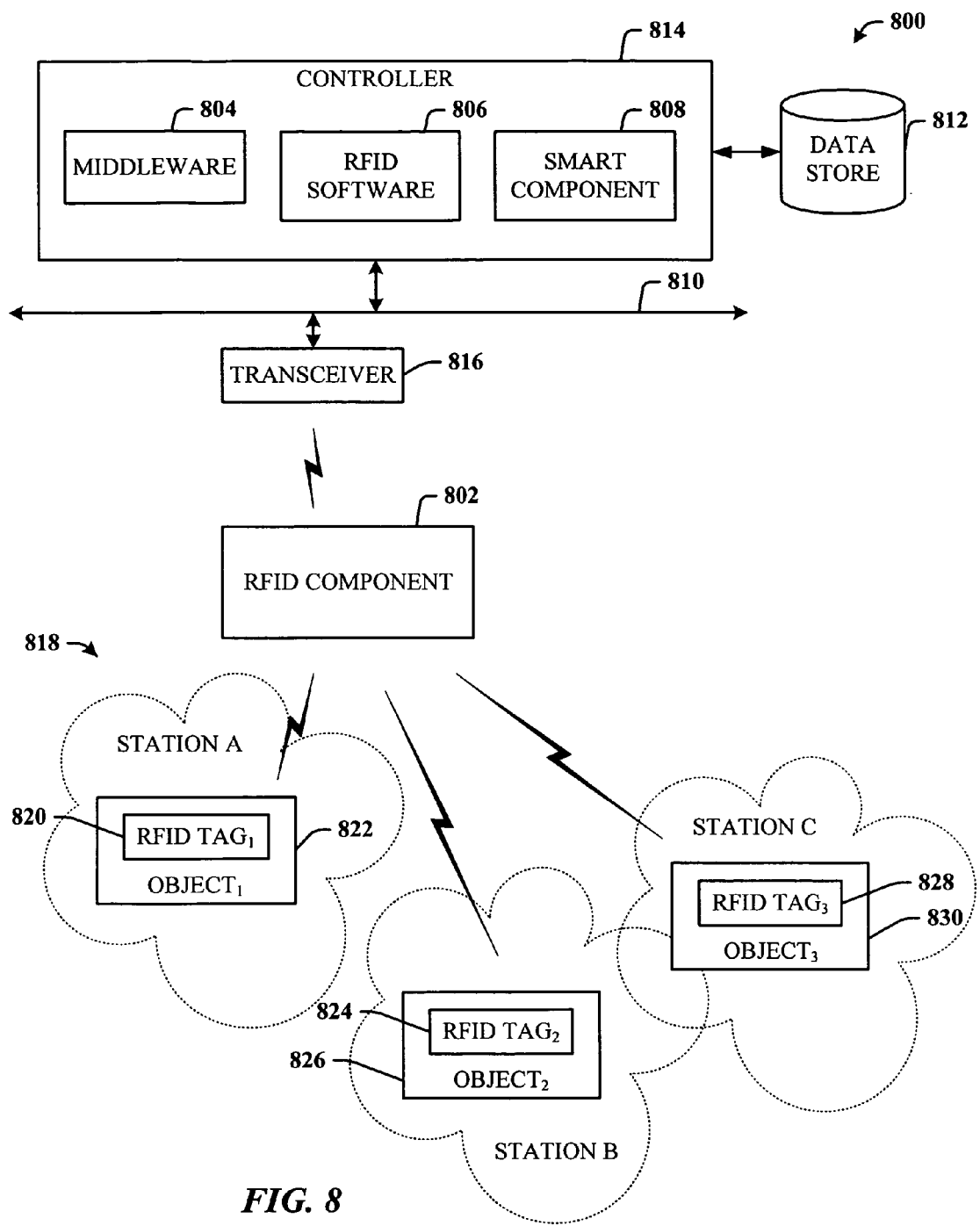
FIG. 8 illustrates a block diagram of an RFID system having a plurality of stations that interact with a plurality of objects having respective RFID tags.

FIG. 8 illustrates a block diagram of an RFID system 800 having a plurality of stations that interact with a plurality of objects having respective RFID tags. When an RFID component 802 (e.g., an RFID reader) reads RFID tags, a read signal is broadcast from the RFID component 802 that energizes and/or causes to be received RFID tag data from all tags in a given range thereof. Thus, the RFID component 802 can receive data from a large number of tags for which data is not desired. Not only does this impose additional processing requirements on the RFID component 802, but it can also negatively impact network bandwidth between the RFID component 802 and a remote system.

The system can also include a network 810 on which is disposed a controller 814 that can integrate at least one of middleware 804, RFID software 806, and/or a smart component 808. It is to be appreciated that the controller 814, middleware 804, RFID software 806, and smart component 808 can be substantially similar to components and/or elements described in previous figures. Moreover, the controller 814 (e.g., a PLC) can also be disposed on the network 810 in control of an automated process such as moving product down an assembly line. The controller 814 can utilize a data store 812 to store any suitable information and/or data associated with the system 800. A transceiver 816 provides wireless network communications between the network 810 and the RFID component 802 such that location data and tag data can be communicated to the controller 814.

Illustrated are objects 818 (denoted $OBJECT_1$, $OBJECT_2$, and $OBJECT_3$) and associated RFID tags (denoted $RFID\ TAG_1$, $RFID\ TAG_2$, and $RFID\ TAG_3$) in respective stations (STATION A, STATION B, AND STATION C). The user desires to read a tag 820 of a first object 822 in station A, yet receives in addition thereto data from a second tag 824 of a second object 826 in station B and a third tag 828 of a third object 830 in a station C. The location system 806 can facilitate the determination of location data of the reader 802 such that in this example, the user is determined to be closer to station A.

It can already be known from prior tag scans and/or user input information, for example, that the first object 822 is associated with station A, the second object 826 is associated with station B, and the third object 830 is associated with station C. Accordingly, any other tag data received by the reader 802 indicating that the tag (824 and 828) is associated with an object that is not in station A can be filtered without further processing. Similarly, as the user moves the mobile reader that contains the RFID component 802 closer to station B, the tag data that is received from object tags in station A and station C can be filtered out from further consideration.

Figure 9:
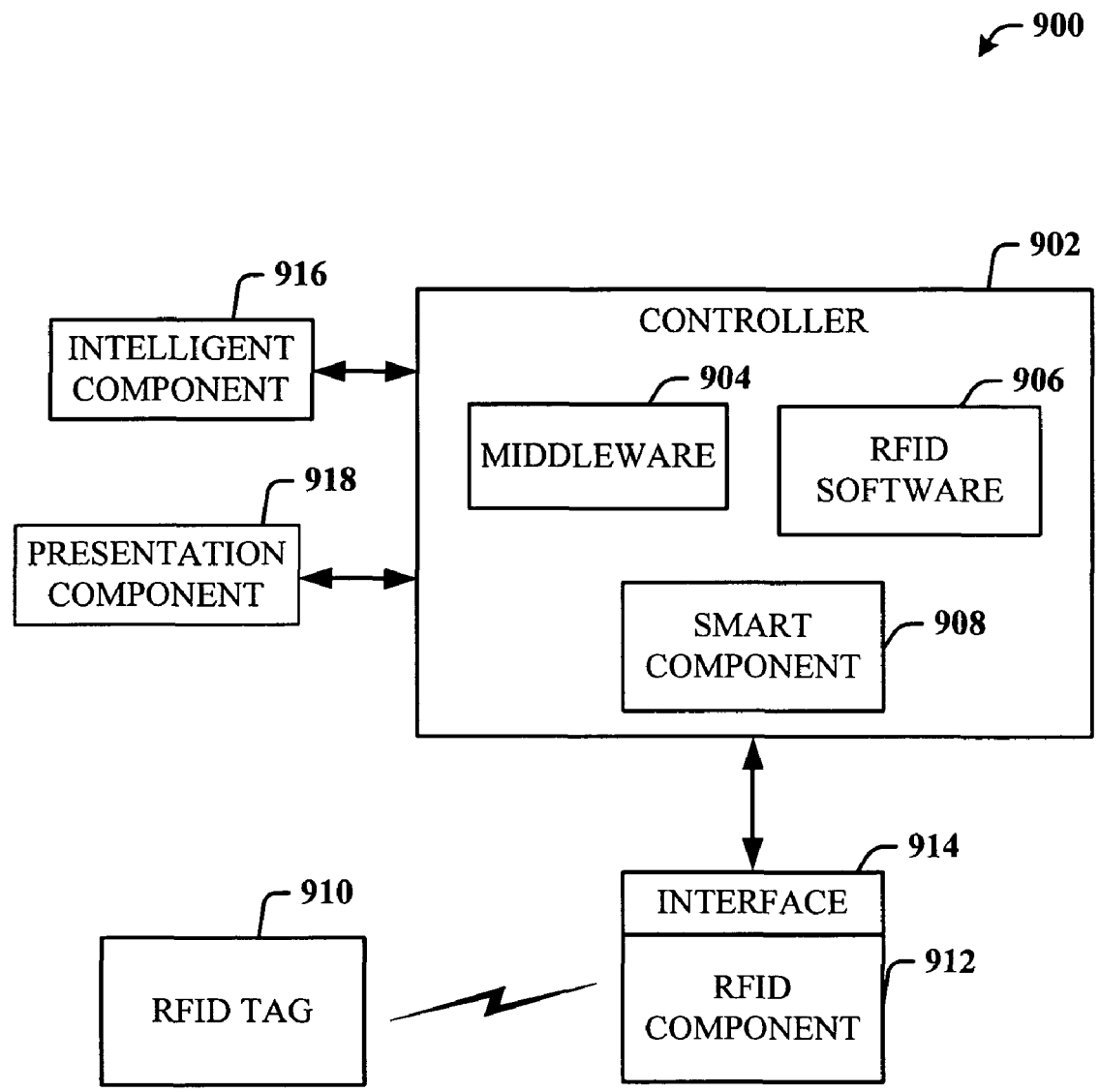
FIG. 9 illustrates a block diagram of an exemplary system that facilitates utilizing RFID technology with a controller.

FIG. 9 illustrates a system 900 that facilitates utilizing RFID technology with a controller. The system 900 can employ intelligence to facilitate utilizing a controller 902 with RFID technology to enhance RFID component functionality and controller functionality. The controller 902 can be integrated and/or embedded with integrated middleware 904, RFID software 906, and/or a smart component 908. The system 900 can include the controller 902 with integrated middleware 904, RFID software 906, and/or a smart component 908, an RFID tag 910, an RFID component 912, and an interface 914 that can all be substantially similar to respective components, middleware, software, controllers, and tags described in previous figures. The system 900 further includes an intelligent component 916. The intelligent component 916 can be utilized by the controller 902 to facilitate implementation of the RFID tag data within an automation system and/or process. For example, the intelligent component 916 can infer the operation and/or mechanisms to be instantiated upon an object associated with the RFID tag 910, filtering signals, location, etc.

It is to be understood that the intelligent component 916 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 918 can provide various types of user interfaces to facilitate interaction between a user and any component associated with the system 900. As depicted, the presentation component 918 is a separate entity that can be utilized with the controller 902. However, it is to be appreciated that the presentation component 918 and/or similar view components can be incorporated into the controller 902 and/or a stand-alone unit. The presentation component 918 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the controller 902.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 10:
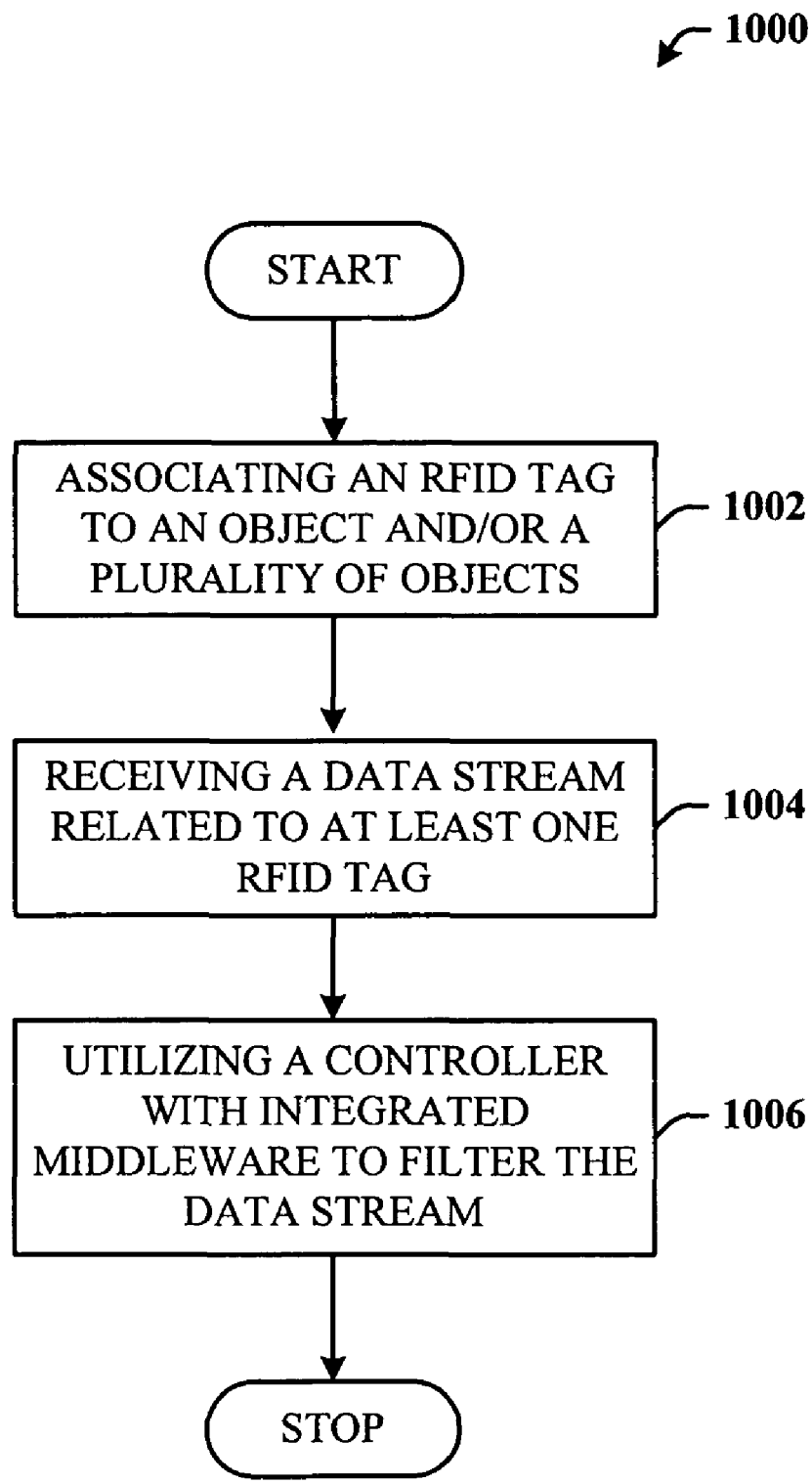
FIG. 10 illustrates a methodology for integrating middleware into a controller to provide efficient filtering of a data stream.
Figure 11:
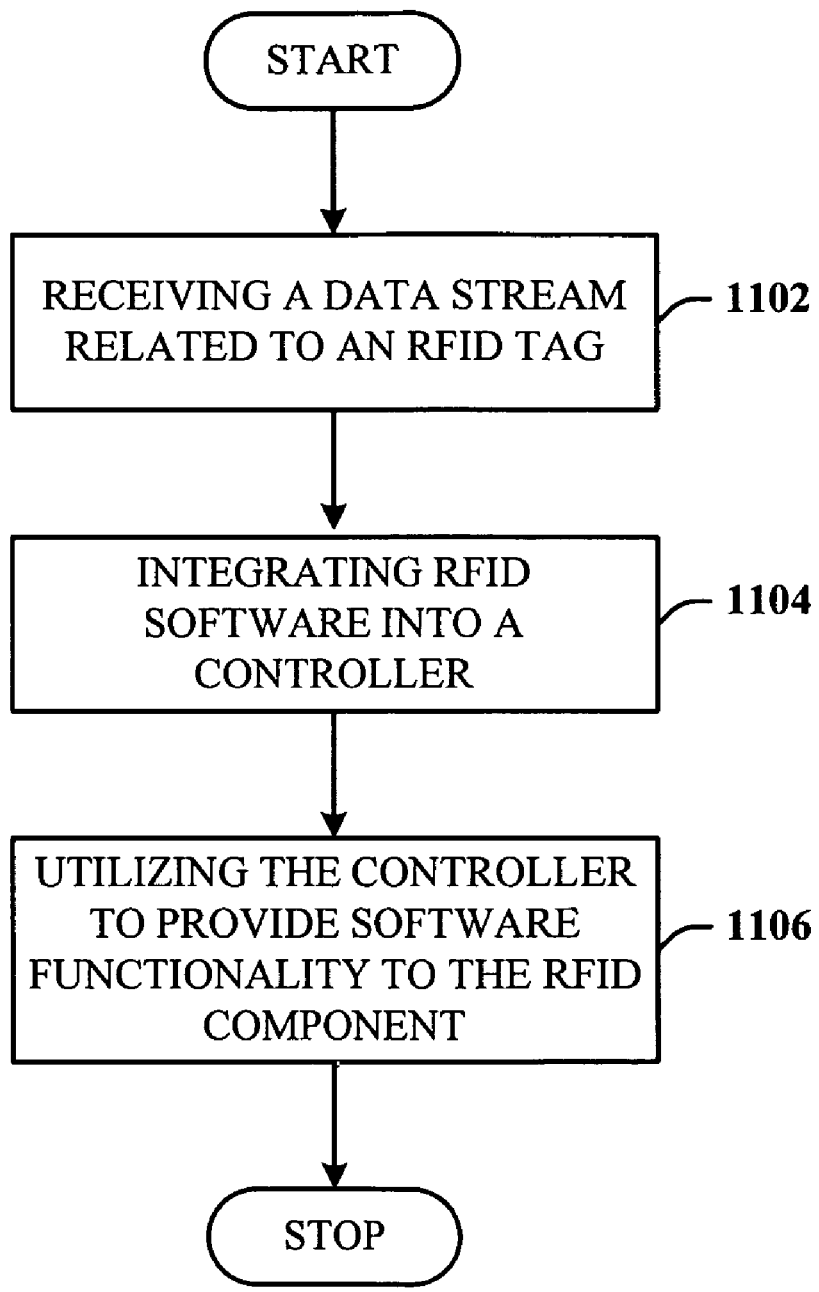
FIG. 11 illustrates a methodology that facilitates integrating RFID software into a controller.
Figure 12:
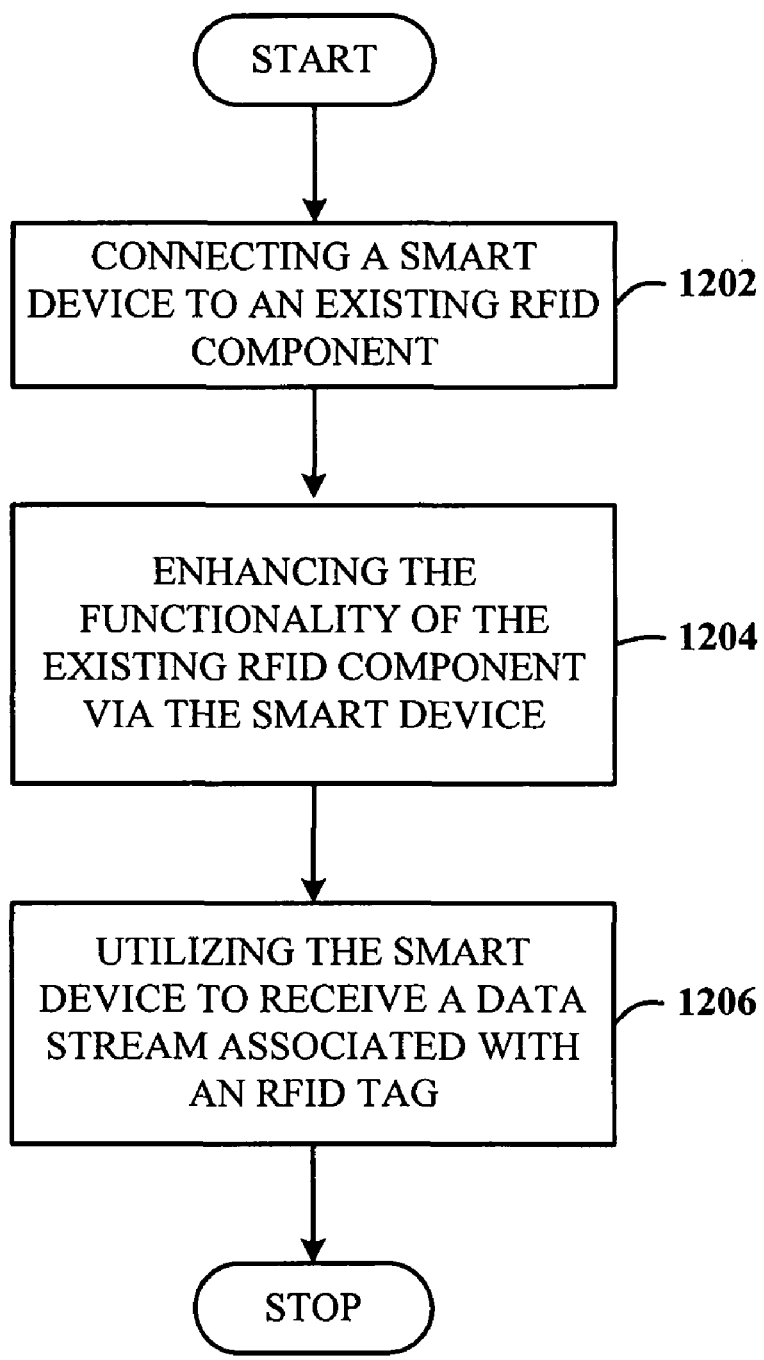
FIG. 12 illustrates a methodology for connecting a smart device to an existing RFID component.

FIGS. 10-12 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 10 illustrates a methodology 1000 for integrating middleware into a controller to provide efficient filtering of a data stream. At reference numeral 1002, an RFID tag can be associated with an object, item, box, pallet, good, any suitable entity related to an automation process and/or object. In addition, the RFID tag can be related to a portion of the objects, items, boxes, etc. The RFID tag can transfer data via wireless communications to at least one RFID component. Moreover, the RFID tag can be either an active RFID tag or a passive RFID tag. The RFID component can be, but is not limited to, various components that read, write, receive, and/or store electronic product data, such as, readers, readers/writers, writers and/or servers, and can be a handheld device or a fixed-mount device depending on the particular application. At reference numeral 1004, a data stream related to at least one RFID tag is received by the RFID component. It is to be appreciated that the data stream can be specific to a particular RFID tag, and/or a plurality of data streams can be received from a plurality of RFID tags.

At reference numeral 1006, a controller with integrated middleware can be utilized to filter the data stream received. It is to be appreciated that the controller can contain software components and hardware components having inputs and/or outputs that can be utilized in connection with automating an industrial manufacturing device and/or process. By integrating the middleware associated with the RFID components, the controller can be efficient by eliminating the need for a separate computer to host the middleware and by allowing the controller to contribute to filtering by utilizing at least a portion of data from the controller and/or sensors associated therewith. In other words, the controller can have integrated filtering software that can filter the data streams associated with the RFID components to provide an efficient and enhanced controller for automation systems and/or processes.

The integration of middleware into the controller can provide improved functionality. For instance, the following can be provided by the controller with integrated middleware: 1) sharing of information from disparate RFID components; 2) seamless configuration through a single controller for disparate RFID components; 3) utilization of sensor data related to object and/or item location to optimize implementation of RFID components; 4) monitoring and/or managing data stream size receipt to the controller; 5) common HMI environment; and 6) clock synchronization to provide controller, system, and RFID component synchronization.

FIG. 11 illustrates a methodology 1100 that facilitates integrating RFID software into a controller. At reference numeral 1102, a data stream related to an RFID tag can be received by a controller via an RFID component. The RFID tag can be associated with an object and/or item involved with an automation process and/or application. The RFID tag can be either an active RFID tag or a passive RFID tag. Additionally, the RFID component can be, but is not limited to, various components that read, write, receive, and/or store electronic product data, such as, readers, readers/writers, writers and/or servers, and can be a handheld device or a fixed-mount device depending on the particular application.

At reference numeral 1104, RFID software can be integrated and/or embedded into a controller. The controller can contain software components and hardware components having inputs and/or outputs that can be utilized in connection with automating an industrial manufacturing device and/or process. Any software functionality that typically exists in an RFID component can be embedded into the controller. The RFID software can relate to, but is not limited to, demodulating, decoding, converting (e.g., analog signal to binary information and vice-versa). At reference numeral 1106, the controller with embedded RFID software is utilized. By integrating the RFID software into the controller, the controller plus RFID software is a more industrially hardened platform. Furthermore, such integration reduces the need for additional infrastructure on a plant and/or warehouse floor, addresses read collision problems, tag collision problems, and enables aggregate and/or distributed control of RFID components within the system via a single interface.

FIG. 12 illustrates a methodology 1200 for connecting a smart device to an existing RFID component. At reference numeral 1202, a smart device can be connected to an existing RFID component. The RFID component can be, but is not limited to, various components that read, write, receive, and/or store electronic product data, such as, readers, readers/writers, writers and/or servers, and can be a handheld device or a fixed-mount device depending on the particular application. The smart device can be, but is not limited to, a micro PLC, a controller, any suitable device that provides a common programming language to a user. The smart device can connect to the existing RFID component by utilizing any pre-existing interface such as a serial port, an Ethernet port, etc.

At reference numeral 1204, the functionality of the existing RFID component is enhanced and/or improved. For instance, the smart device can provide additional inputs, outputs, wherein the inputs and/or outputs can be at least one of digital and analog. Furthermore, the smart device can allow additional sensors to be utilized with the RFID component, such that location information can be employed. Additionally, the smart device can provide additional networking capabilities. At reference numeral 1206, the smart device coupled with the existing RFID component can be utilized to receive at least one data stream associated with an RFID tag.

Figure 13:
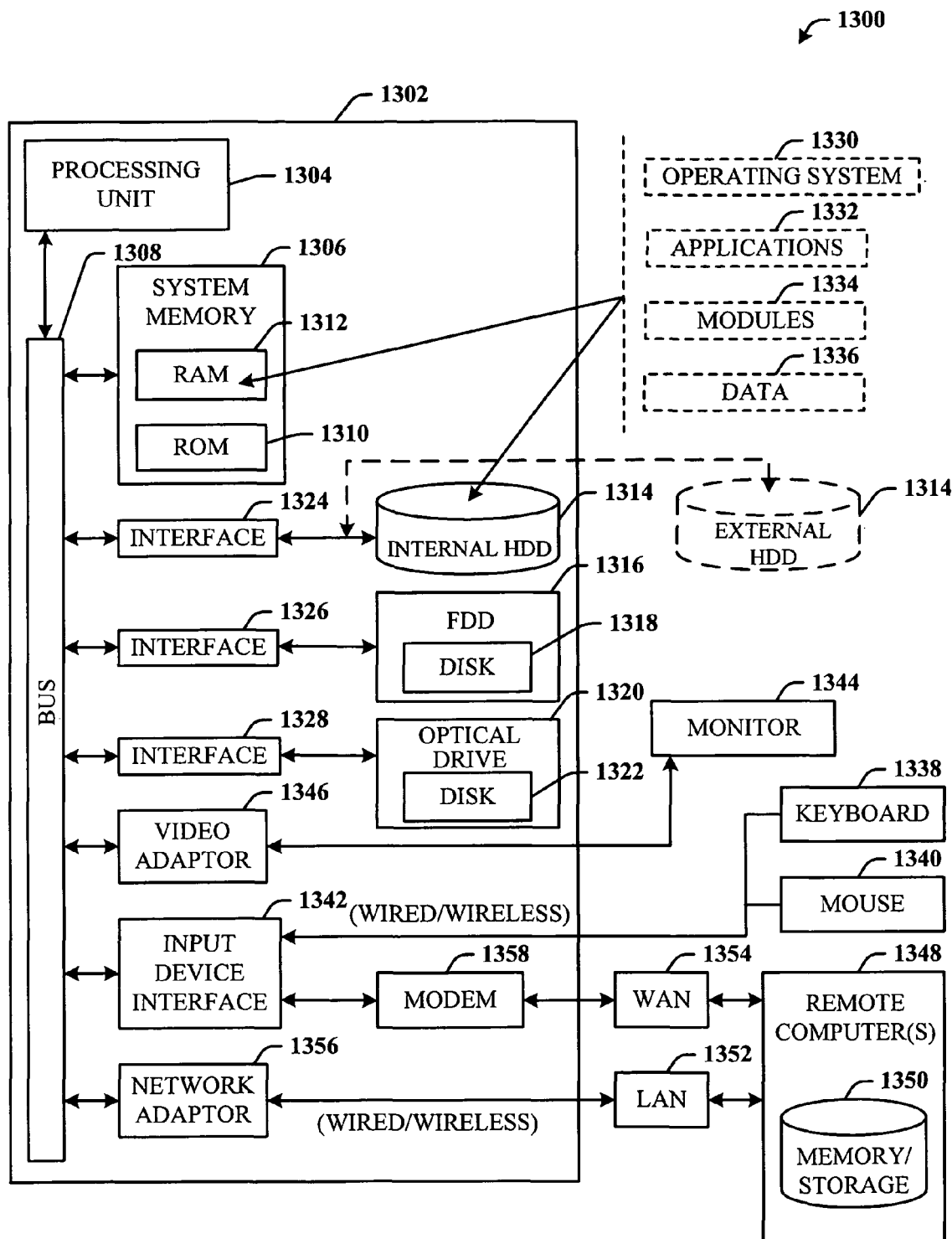
FIG. 13 illustrates a block diagram of a computer operable to execute the disclosed architecture.
Figure 14:
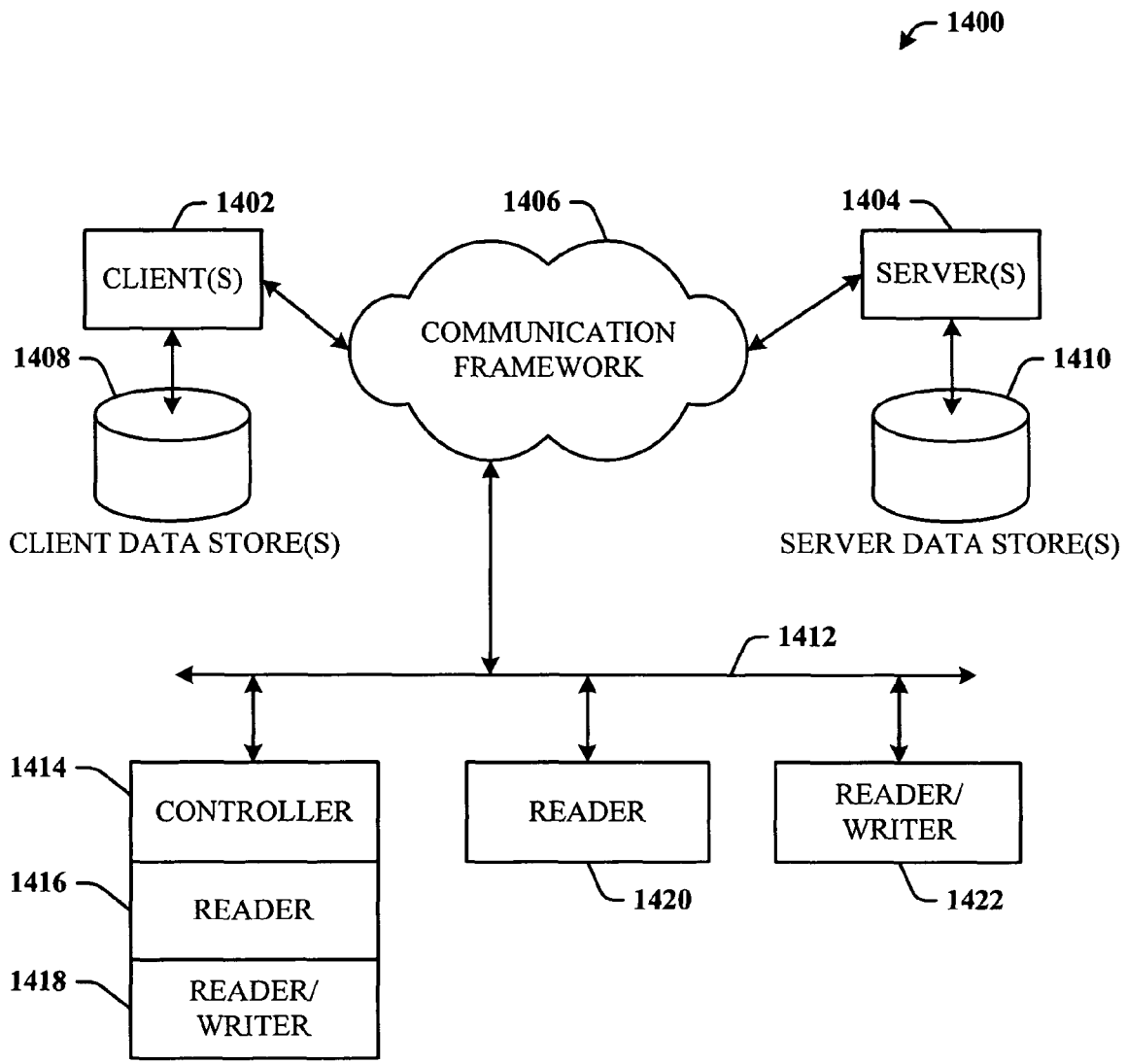
FIG. 14 illustrates a schematic block diagram of an exemplary computing environment in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the invention includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316, and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1312, including an operating system 1330, one or more application programs 1332, other program modules 1334, and program data 1336. All or portions of the operating system, applications, modules, and/or data can also be cached in the RAM 1312. It is appreciated that the invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device, or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Referring now to FIG. 14, there is illustrated a schematic block diagram of an exemplary computing environment 1400 in accordance with the subject invention. The system 1400 includes one or more client(s) 1402. The client(s) 1402 can be hardware and/or software (e.g., threads, processes, computing devices). The client(s) 1402 can house cookie(s) and/or associated contextual information by employing the invention, for example.

The system 1400 also includes one or more server(s) 1404. The server(s) 1404 can also be hardware and/or software (e.g., threads, processes, computing devices). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The framework 1406 can also include a subnetwork 1412, for example, that can be implemented as in an assembly line environment. The subnetwork 1412 can have disposed thereon as nodes, a controller 1414 (e.g., a PLC) that controls a reader module 1416 and a reader/writer module 1418 both of which can read RFID tags, and the latter of which can write data to the RFID tags. The controller 1414, reader module 1416 and reader/writer module 1418 can be provided in a rack configuration at selected locations. Alternatively or in combination therewith, the subnetwork 1412 can also include a second reader module 1420 as a wired or wireless node (or client) that is positioned (fixed or mobile) to read RFD tags, as needed. Similarly, the subnetwork 1412 can also support a reader/writer module 1422 as a wired and/or wireless client node for reading and writing data and signals to RIFD tags that come within a coverage area.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
a first radio frequency identification (RFID) reader of a first type configured to receive a first data stream from a first RFID tag via a first wireless communication and send a first input corresponding to the first data stream to an RFID software according to a first protocol;
a second RFID reader of a second type configured to receive a second data stream from a second RFID tag via a second wireless communication and send a second input corresponding to the second data stream to the RFID software according to a second protocol that is different from the first protocol, wherein the first type and the second type differ in make, model, or brand;
a controller, comprising:
a backplane,
a memory that stores the RFID software that processes the first input from the first RFID reader and the second input from the second RFID reader;
a processor that facilitates execution of the RFID software;
a smart component that electrically interfaces with the backplane, the first RFID reader, and the second RFID reader, wherein the smart component provides a universal connection to the first RFID reader and the second RFID reader and provides an additional input and output to the first RFID reader and the second RFID reader, wherein the smart component facilitates programming of the first RFID reader and the second RFID reader according to a common programming language;
a middleware module that interfaces with the first RFID reader and the second RFID reader through the smart component and hosts a middleware that facilitates sharing of information between the first RFID reader and the second RFID reader by comparing signal strengths associated with the first RFID reader and the second RFID reader, wherein the middleware further provides a common filtering software for the first RFID reader and the second RFID reader; and
a data flow manager that monitors and provides limitations in relation to a number of bytes sent from at least one of the first RFID reader and the second RFID reader in a transaction.

2. The system of claim 1, wherein the RFID software is configured to optimize at least one of:
turning on the first RFID reader or the second RFID reader, or
turning off the first RFID reader or the second RFID reader.

3. The system of claim 1, wherein the RFID software is further configured to utilize a sensor associated with the controller to determine a location of the RFID tag.

4. The system of claim 1, wherein the middleware further comprises a clock synchronization component configured to synchronize a clock associated with the controller to a clock associated with the first RFID reader or the second RFID reader.

5. The system of claim 1, wherein the smart component is a micro programmable logic controller (PLC).

6. The system of claim 1, wherein the middleware comprises a filter master configured to interface with the first RFID reader and the second RFID reader and provide the common filtering software for the first RFID reader and the second RFID reader.

7. The system of claim 1, wherein the RFID software is configured to demodulate the first data stream from the first RFID reader and the second data stream from the second RFID reader.

8. The system of claim 1, wherein the RFID software is configured to decode the first data stream from the first RFID reader and the second data stream from the second RFID reader.

9. A method, comprising:
- receiving a first input corresponding to a first data stream related to a radio frequency identification (RFID) tag from a first RFID reader of a first type according to a first communication protocol through a smart component at RFID software of an industrial controller
- receiving a second input corresponding to a second data stream related to a second RFID tag from a second RFID reader of a second type, that is different from the first type in make, model or brand, according to a second communication protocol that is different from the first protocol through the smart component at RFID software of the industrial controller, wherein the smart component electrically interfaces with the first RFID reader, the second RFID reader and the industrial controller and provides an additional input and output to the first RFID reader and the second RFID reader;
- facilitating universal programming of the first RFID reader and the second RFID reader through a common programming language at the smart component;
- executing middleware hosted on a middleware module that interfaces with the first RFID reader and the second RFID reader through the smart component and facilitating sharing of information between the first RFID reader and the second RFID reader by comparing signal strengths associated with the first RFID reader and the second RFID reader and facilitating universal filtering of the first input and the second input;
- monitoring a number of bytes sent from at least one of the first RFID reader and the second RFID reader in a transaction and providing limitations on the number of bytes sent from at least one of the first RFID reader and the second RFID reader by a data flow manager; and
- executing RFID software stored in memory of the industrial controller with a processor to process the first data stream and the second data stream.

* * * * *